United States Patent
Yang et al.

(10) Patent No.: US 12,108,261 B2
(45) Date of Patent: Oct. 1, 2024

(54) COORDINATED MULTI-ACCESS-POINT TRANSMISSION

(71) Applicant: Huawei Technologies Co., Ltd., Shenzhen (CN)

(72) Inventors: Mao Yang, Xi'an (CN); Bo Li, Xi'an (CN); Yuchen Guo, Shenzhen (CN); Mingjie Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 484 days.

(21) Appl. No.: 17/146,060

(22) Filed: Jan. 11, 2021

(65) Prior Publication Data

US 2021/0136599 A1 May 6, 2021

Related U.S. Application Data

(63) Continuation of application No. PCT/CN2019/092578, filed on Jun. 24, 2019.

(30) Foreign Application Priority Data

Jul. 11, 2018 (CN) .......................... 201810759773.6

(51) Int. Cl.
| | |
|---|---|
| *H04W 16/28* | (2009.01) |
| *H04L 1/1607* | (2023.01) |
| *H04W 4/70* | (2018.01) |
| *H04W 72/044* | (2023.01) |
| *H04W 72/0446* | (2023.01) |
| *H04W 72/27* | (2023.01) |

(52) U.S. Cl.
CPC ............ *H04W 16/28* (2013.01); *H04L 1/1621* (2013.01); *H04W 4/70* (2018.02); *H04W 72/0446* (2013.01); *H04W 72/046* (2013.01); *H04W 72/27* (2023.01)

(58) Field of Classification Search
CPC ....... H04W 16/28; H04W 4/70; H04W 72/27; H04W 72/0446; H04W 72/046; H04L 1/1621
See application file for complete search history.

(56) References Cited

U.S. PATENT DOCUMENTS

| | | | |
|---|---|---|---|
| 10,856,167 B2 * | 12/2020 | Zhu ........................ | H04B 7/024 |
| 2014/0112175 A1 | 4/2014 | Pantelidou et al. | |
| 2016/0066196 A1 | 3/2016 | Jiang et al. | |

(Continued)

FOREIGN PATENT DOCUMENTS

| | | |
|---|---|---|
| CN | 104185188 A | 12/2014 |
| EP | 3026974 A1 | 6/2016 |
| WO | 2018005788 A1 | 1/2018 |

*Primary Examiner* — Jasper Kwoh
(74) *Attorney, Agent, or Firm* — Conley Rose, P.C.

(57) ABSTRACT

A coordinated multi-access-point transmission method, where a first access point (AP) sends, to a second AP, transmission control information that carries link transmission direction information, and the first AP and the second AP pre-coordinate a transmission direction of a first link and a transmission direction of a second link, where concurrent transmission is performed on the first link and the second link. Further, the first AP completes data transmission on the first link based on the transmission control information, and the second AP completes data transmission on the second link based on the transmission control information.

20 Claims, 25 Drawing Sheets

(56) References Cited

U.S. PATENT DOCUMENTS

| | | | |
|---|---|---|---|
| 2016/0072569 A1* | 3/2016 | Yang | H04B 7/0619 |
| | | | 370/329 |
| 2016/0157195 A1 | 6/2016 | Wang et al. | |
| 2017/0279641 A1* | 9/2017 | Liu | H04B 7/024 |
| 2018/0317197 A1* | 11/2018 | Kasher | G01S 5/12 |
| 2019/0208423 A1* | 7/2019 | Cherian | H04W 48/16 |
| 2019/0327763 A1* | 10/2019 | Sugai | H04L 5/0055 |
| 2020/0214034 A1* | 7/2020 | Li | H04W 72/0453 |

* cited by examiner

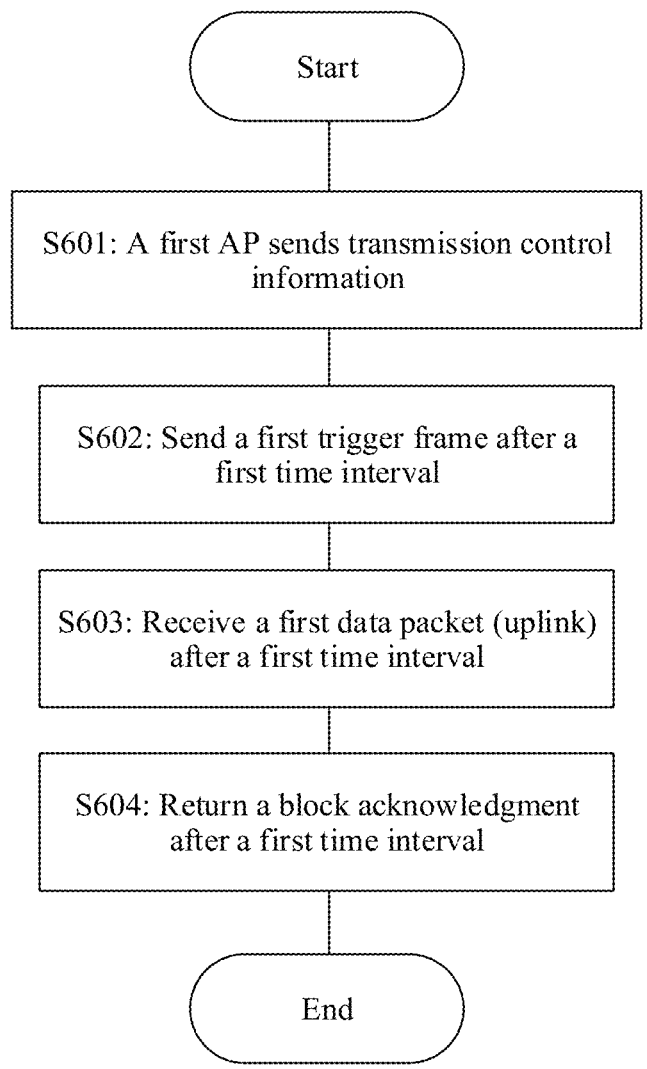

COORDINATED MULTI-ACCESS-POINT TRANSMISSION

CROSS-REFERENCE TO RELATED APPLICATIONS

This application is a continuation of International Patent Application No. PCT/CN2019/092578 filed on Jun. 24, 2019, which claims priority to Chinese Patent Application No. 201810759773.6 filed on Jul. 11, 2018. The disclosures of the aforementioned applications are hereby incorporated by reference in their entireties.

TECHNICAL FIELD

This application relates to the field of communications technologies, and in particular, to a coordinated multi-access-point transmission method, a related apparatus, and a system.

BACKGROUND

A wireless local area network (WLAN) is one of foremost bearer manners for global data services. Currently, with continuous increase of user equipment and continuous development of an Internet of things (IOT) requirement, a high-dense deployment scenario becomes a core important scenario of a future wireless network. High-dense deployment means that a large quantity of deployed APs and a large quantity of active stations (STAs) exist within limited geographical coverage such that network interference increases sharply and a feature is more complex and difficult to master.

The Institute of Electrical and Electronics Engineers (IEEE) 802.11ax standard introduces a series of spatial reuse (SR) technologies, for example, an overlapping basic service set packet detect based (OBSS_PD-based) SR technology and an SR parameter based (SRP-based) SR technology. A core idea of the OBSS_PD-based SR technology is as follows. If determining that a received data packet is a data packet from a neighboring cell, a station may increase a carrier sensing threshold such that the station has a better opportunity to perform concurrent transmission. A core idea of the SRP-based SR technology is as follows. A station receives a data packet of a neighboring cell. For example, typically, the data packet may be a trigger frame, where the trigger frame definitely indicates that a station of the neighboring cell is allowed to perform concurrent transmission in a data transmission process of the cell such that the station may obtain a concurrent transmission opportunity based on contention.

An SR manner that is spontaneous and not coordinated and planned in advance is used in both the OBSS_PD-based SR technology and the SRP-based SR technology. This causes uncontrollable interference and suppresses a throughput.

SUMMARY

To resolve the foregoing problem, this application provides a coordinated multi-access-point transmission method. The method includes a first access point (AP) sends transmission control information to a second AP, and coordinates and plans an SR transmission direction in advance, to control a link transmission direction of concurrent transmission in SR. The transmission control information sent by the first AP includes link transmission direction information used to indicate transmission directions of a first link and at least one second link to the second AP. The first link is a link between the first AP and at least one first STA, and the at least one first STA is associated with the first AP. The second link is a link between the second AP and at least one second STA or is a link between at least two second STAs in the at least one second STA, and the at least one second STA is associated with the second AP. Further, the first AP completes transmission of a first data packet on the first link based on the transmission control information, and the second AP completes transmission of a second data packet on the second link based on the transmission control information.

In a possible implementation, a time range occupied by the first data packet is the same as a time range occupied by the second data packet. Based on this solution, mutual interference between the first data packet and the second data packet is avoided such that communication quality of the SR is higher.

In a possible implementation, the transmission directions that are of the first link and the second link and that are indicated using the link transmission direction include but are not limited to a plurality of combinations. The first link is one of an uplink or a downlink, and the second link is one of an uplink, a downlink, an uplink/a downlink, and a device-to-device (D2D) link. Based on this solution, the first AP may implement pre-coordinated control over the transmission direction of the second link that is concurrent with the first link. It may be understood that the link transmission direction is used to indicate transmission directions of one first link and at least one second link. To be specific, the link transmission direction may further be used to indicate transmission directions of one first link and a plurality of second links.

In a possible implementation, when the link transmission information is used to indicate that the first link is a downlink and the second link is an uplink/a downlink, the first AP may determine, based on energy detection, whether the second AP sends a second trigger frame, and when the first AP detects that the second AP sends the second trigger frame, that the first AP completes transmission of a first data packet on the first link includes the first AP sends the first data packet to the at least one first STA after a first time interval from a time point at which the first AP receives the second trigger frame sent by the second AP, or when the first AP does not detect that the second AP sends the second trigger frame, that the first AP completes transmission of a first data packet on the first link includes the first AP sends the first data packet to the at least one first STA after a second time interval from a time point at which the first AP sends a radio frame that carries the transmission control information. Based on this solution, the second AP may determine the transmission direction of the second link based on a service requirement of a basic service set (BSS) of the second AP such that flexibility is higher.

In a possible implementation, the transmission control information further includes one or a combination of the following: an identifier of the second AP, used to indicate the second AP, and a first end time identifier, used to indicate an end time of the first data packet. Information about the identifier of the second AP is carried in the transmission control information such that the first AP can flexibly select a second AP participating in concurrent transmission, and to some extent, a conflict generated after a plurality of APs obtain an SR transmission opportunity is avoided. The second AP that receives the transmission control information may determine, based on the identifier, whether the second AP can participate in the SR.

According to a second aspect, a coordinated multi-access-point transmission method used on a second AP side includes the following.

A second AP receives transmission control information sent by a first AP. The transmission control information includes link transmission direction information used to indicate transmission directions of a first link and a second link to the second AP. The second AP completes transmission of a second data packet on the second link based on the link transmission direction information. The first link is a link between the first AP and at least one first STA, and the at least one first STA is associated with the first AP. The second link is a link between the second AP and at least one second STA or is a link between at least two second STAs in the at least one second STA, and the at least one second STA is associated with the second AP.

It may be understood that the link transmission direction is used to indicate transmission directions of one first link and at least one second link. To be specific, the link transmission direction may further be used to indicate transmission directions of one first link and a plurality of second links.

In a possible implementation, when the link transmission information is used to indicate that the first link is a downlink and the second link is an uplink/a downlink, the second AP determines, based on a service requirement, that the second link is an uplink or a downlink, and when the second AP determines that the second link is an uplink, that the second AP completes transmission of a second data packet on the second link includes the second AP sends a second trigger frame to the at least one second STA after a first time interval from a time point at which the second AP receives the transmission control information, where the second trigger frame is used to trigger the at least one second STA to send the second data packet to the second AP, or when the second AP determines that the second link is a downlink, that the second AP completes transmission of a second data packet on the second link includes the second AP sends the second data packet to the at least one second STA after a second time interval from a time point at which the second AP receives a radio frame that carries the transmission control information. Based on this solution, the second AP may determine the transmission direction of the second link based on a service requirement of a BSS of the second AP such that flexibility is higher.

In a possible implementation, when the link transmission information is used to indicate that the first link is an uplink and the second link is D2D, that the second AP completes transmission of a second data packet on the second link includes the second AP sends a second trigger frame to the at least one second STA after a first time interval from a time point at which the second AP receives a radio frame that carries the transmission control information. The second trigger frame is used to trigger one of two first STAs in the at least one second STA to send the second data packet to the other first STA. The transmission control information further includes a second end time identifier, and the second end time identifier is used to indicate an end time of the first trigger frame. The second AP may determine the end time of the first trigger frame on the first link based on the second end time such that the second AP schedules the transmission of the second data packet on the second link.

In a possible implementation, the transmission control information further includes one or a combination of the following: an identifier of the second AP, used to indicate the second AP, and a first end time identifier, used to indicate an end time of the first data packet. Information about the identifier of the second AP is carried in the transmission control information such that the first AP can flexibly select a second AP participating in concurrent transmission, and to some extent, a conflict generated after a plurality of APs obtain an SR transmission opportunity is avoided. The second AP that receives the transmission control information may determine, based on the identifier, whether the second AP can participate in SR.

According to a third aspect, an embodiment of this application provides a communications apparatus on a first access point side. The apparatus may be a first access point, or may be a chip in a first access point. The apparatus has a function of implementing the first access point in the first aspect. The function may be implemented by hardware, or may be implemented by hardware by executing corresponding software. The hardware or the software includes one or more units corresponding to the function.

In a possible implementation, when the apparatus is a first access point, the first access point includes a processor and a transceiver. The processor is configured to support the first AP in performing a corresponding function in the foregoing methods. The transceiver is configured to support the first AP in communicating with the second AP, and send, to the second access point, transmission control information that carries a link transmission direction. Optionally, the first access point may further include a memory. The memory is configured to be coupled to the processor, and the memory stores a program instruction and data that are necessary for the first access point.

According to a fourth aspect, this application provides a communications apparatus on a second access point side. The apparatus may be a second access point, or may be a chip in a second access point. The apparatus has a function of implementing the second access point in the second aspect. The function may be implemented by hardware, or may be implemented by hardware by executing corresponding software. The hardware or the software includes one or more units corresponding to the function.

In a possible implementation, when the apparatus is a second access point, the second access point includes a processor and a transceiver. The processor is configured to support the second AP in performing a corresponding function in the foregoing methods. The transceiver is configured to support the second AP in communicating with the first AP or a station, for example, receive transmission control information that is sent by the first access point and that carries transmission directions of a first link and a second link. Optionally, the second access point may further include a memory. The memory is configured to be coupled to the processor, and the memory stores a program instruction and data that are necessary for the second access point.

The processor mentioned anywhere above may be a general-purpose central processing unit (CPU), a microprocessor, an application-specific integrated circuit (ASIC), or one or more integrated circuits configured to control program execution in the coordinated multi-access-point transmission methods in the foregoing aspects.

According to a fifth aspect, this application provides a computer-readable storage medium. The computer-readable storage medium stores an instruction, and the instruction may be executed by one or more processors on a processing circuit. When the instruction is run on a computer, the computer is enabled to perform the method in the first aspect or the second aspect.

According to a sixth aspect, a computer program product including an instruction is provided. When the computer program product runs on a computer, the computer is enabled to perform the method in any one of the first aspect and the second aspect or the possible implementations of the first aspect and the second aspect. All or a part of the computer program product may be stored in a storage medium encapsulated in a processor, or all or a part of the computer program product may be stored in a storage medium encapsulated outside a processor.

According to a seventh aspect, an embodiment of this application provides a wireless communications system. The system includes the first access point and the at least one second access point in the foregoing aspects.

BRIEF DESCRIPTION OF DRAWINGS

FIG. 5 shows an example structure of transmission control information according to an embodiment of this application;

FIG. 6 shows a processing procedure on a first AP side used when a first link is an uplink (UL);

DESCRIPTION OF EMBODIMENTS

A scenario described in embodiments of this application is intended to describe the technical solutions in the embodiments of this application more clearly, and does not constitute a limitation on the technical solutions provided in the embodiments of this application. Clearly, the described embodiments are merely some but not all of the embodiments of the present disclosure. All other embodiments obtained by a person of ordinary skill in the art based on the embodiments of this application without creative efforts shall fall within the protection scope of this application.

Some terms in this application are first described to help a person skilled in the art have a better understanding.

(1) A STA is a device that has a wireless connection function and that can provide voice and/or data connectivity for a user, and may also be referred to as a terminal device, user equipment (UE), a mobile station (MS), a mobile terminal (MT), or the like. Currently, some examples of the station include a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a vehicle-mounted device, and the like.

(2) An AP is a device that connects a station to a wireless network in a communications system, and may also be referred to as a radio access network (RAN) node (or device), a base station, or the like. Currently, some examples of the access point are a gNB, a transmission reception point (TRP), an evolved NodeB (eNB), a radio network controller (RNC), a NodeB (NB), a base station controller (BSC), a base transceiver station (BTS), a home NodeB (for example, a home evolved NodeB or a home NodeB (HNB)), a baseband unit (BBU), a WI-FI access point, and another interface device that can work in a wireless environment.

(3) Coordinated transmission means that two or more APs coordinately provide uplink or downlink transmission services for a same user or different users after negotiation.

(4) SR is a method in which concurrent transmission is performed on a plurality of radio links with a specific location difference, and mutual interference between the plurality of links is effectively controlled, to improve transmission efficiency or a throughput per unit time.

Figure 2:
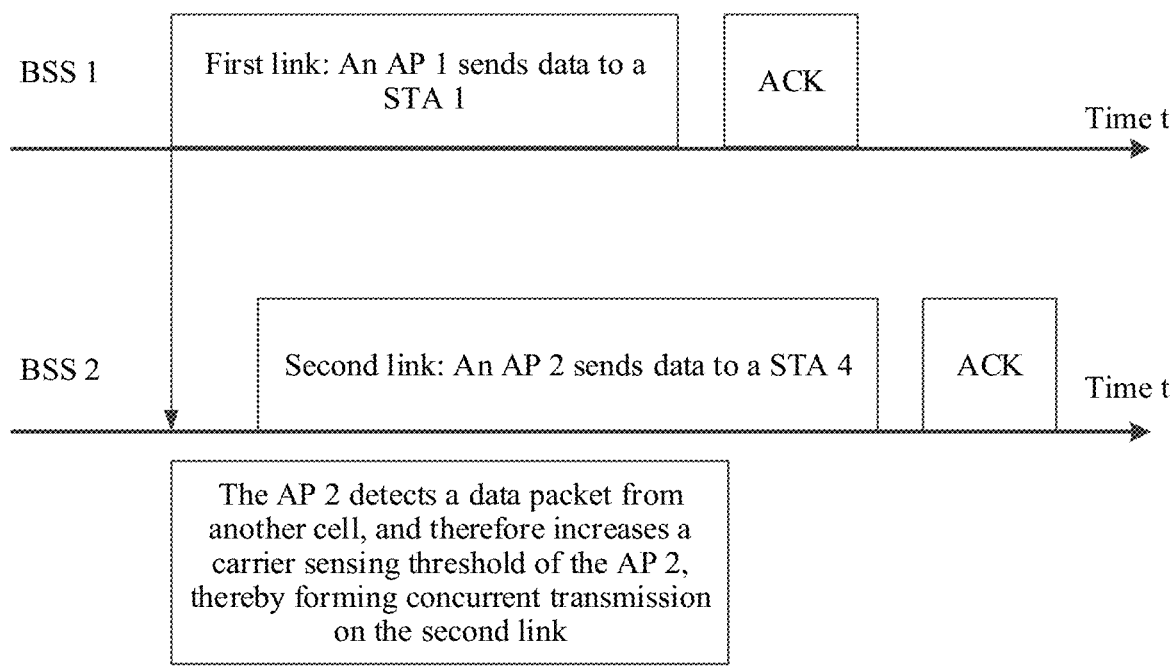
FIG. 2 shows an OBSS_PD-based SR technology.
Figure 3:
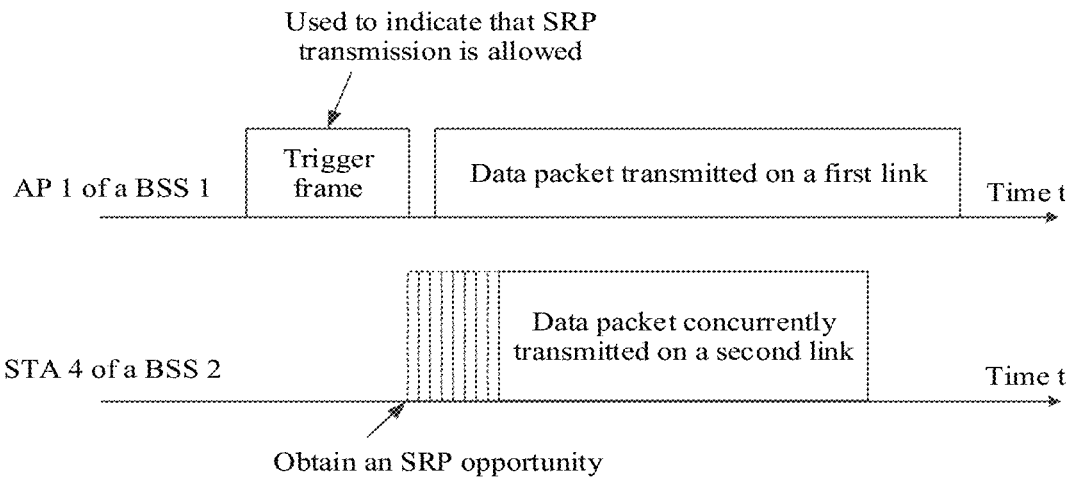
FIG. 3 shows an SRP-based SR technology.

The IEEE 802.11ax standard introduces a series of SR technologies, for example, an OBSS_PD-based SR technology and an SRP-based SR technology. As shown in FIG. 2, a core idea of the OBSS_PD-based SR technology is as follows. If a received data packet is a data packet from a neighboring cell, a station may increase a carrier sensing threshold such that the station has a better opportunity to perform concurrent transmission. A core idea of the SRP-based SR technology is as follows. A station receives a data packet of a neighboring cell (as shown in FIG. 3, the data packet herein may be a data frame, a management frame, or a control frame in a WLAN network), and typically, the data packet may be a trigger frame, where the trigger frame definitely indicates that a station of the neighboring cell is allowed to perform concurrent transmission in a data transmission process of the cell such that the station may obtain a concurrent transmission opportunity based on contention.

(5) A throughput is a key indicator used to measure overall network performance in one or more cells.

(6) A link is a transmission link between one network device and another network device. In this application, a first link is a transmission link in which a first AP participates, and may include, for example, an uplink (UL) and a downlink (DL). A second link is a link in which a second AP participates and that is concurrent with the first link, and may include, for example, an uplink, a downlink, and a D2D link. In an example, the first AP is a primary AP, and the second AP is a secondary AP. It may be understood that an entire network may further include another link, for example, a third link and a fourth link.

(7) Channels are usually classified into a primary channel and a secondary channel in a WLAN. The primary channel is a common operating channel of all stations in a BSS. The secondary channel may include one or more sub-channels. In an example, if classification is performed using 20 megahertz (MHz) as a basic bandwidth unit, when a channel bandwidth is 20 MHz, there is only one primary channel with a bandwidth of 20 MHZ, or when a channel bandwidth is greater than 20 MHZ, one channel with a bandwidth of 20 MHz is a primary channel, and one or more other 20 MHz channels are secondary channels. For example, when a channel bandwidth is 80 MHZ, the channels are sequentially numbered as a channel 1 to a channel 4, and each sequence number indicates one 20 MHz channel. The channel 1 indicates a primary 20 MHZ channel, the channel 2 indicates a secondary 20 MHz channel (S20), and one secondary 40 MHZ channel (S40) includes two sub-channels with a bandwidth of 20 MHZ, which are respectively the channel 3 and the channel 4.

Figure 1:
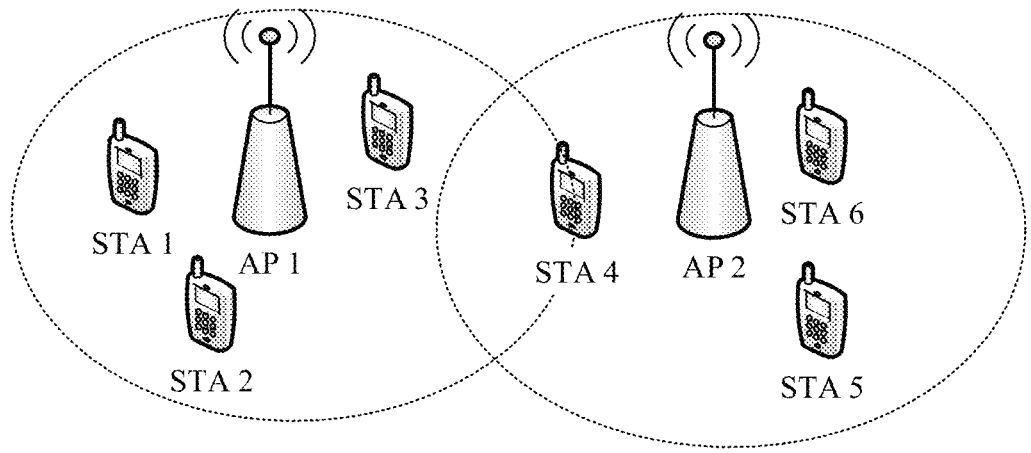
FIG. 1 shows an example of a communications system according to an embodiment of this application.

FIG. 1 is an architectural diagram of an example of a communications system 100 according to an embodiment of this application. Referring to FIG. 1, the communications system 100 includes an AP 1 and an AP 2, and further includes stations STA 1, STA 2, and STA 3 associated with the AP 1, and stations STA 4, STA 5, and STA 6 associated with the AP 2. A BSS 1 includes the AP 1, the stations STA 1, STA 2, and STA 3. A BSS 2 includes the AP 2, the STA 4, the STA 5, and the STA 6. In an example, a first link may be an uplink or a downlink between the AP 1 and a station associated with the AP 1. A second link may be an uplink or a downlink between the AP 2 and a station associated with the AP 2, or may be a D2D link between any two stations in the BSS 2, for example, a D2D link between the STA 4 and the STA 5. It should be noted that quantities of access points and stations shown in FIG. 1 are merely an example.

It should be noted that the communications system shown in FIG. 1 does not constitute a limitation on a communications system to which the embodiments of this application are applicable. Therefore, a method provided in the embodiments of this application is applicable to various wireless communications systems, for example, a WI-FI system, a 5th generation (5G) communications system, or various future mobile communications systems. This is not limited in this application.

The system architecture shown in FIG. 1 is used as an example. An OBSS_PD-based SR technology is shown in FIG. 2. The AP 1 in the BSS 1 sends data to the STA 1. In this case, the AP 2 in the BSS 2 determines that a received data packet is a data packet from a neighboring cell (the BSS 1), and then may increase a carrier sensing threshold such that the AP 2 has a better opportunity to perform concurrent transmission, that is, the AP 2 also sends data to the STA 4. An SRP-based SR technology is shown in FIG. 3. The AP 1 in the BSS 1 sends a trigger frame to a STA associated with the AP 1. For example, the AP 1 sends a trigger frame to the STA 3, where the trigger frame indicates that a station of a neighboring cell is allowed to perform concurrent transmission in a data transmission process of the cell. After receiving the trigger frame of the neighboring cell (the BSS 1), the STA 4 in the BSS 2 may send data after obtaining a concurrent transmission opportunity based on contention. However, for two types of existing SR transmission, an SR manner that is spontaneous and not coordinated and planned in advance is used in both the OBSS_PD-based SR technology and the SRP-based SR technology. This causes uncontrollable interference and suppresses a throughput to some extent. In addition, in an existing SR technology, usually concurrent downlink transmission or concurrent uplink transmission is performed on a concurrent link. Services of different BSSs have a random characteristic, and an existing solution cannot flexibly adapt to an actual service requirement between cells. Consequently, it is possible that when service directions are different between the cells (for example, one cell has a UL service, and another cell has a DL service), concurrent transmission cannot be performed, causing reduction of concurrent transmission efficiency.

Compared with the current technology, an embodiment of this application provides a coordinated AP transmission method. A first AP sends, to a second AP, transmission control information that carries an indication of transmission directions of a first link and a second link such that the second AP can implement data transmission on the second link based on the transmission control information. Based on the transmission control information, the first AP may control the transmission direction of the second link to some extent, and the second AP may obtain the transmission direction of the first link such that the first AP and the second AP coordinate and plan the transmission directions of the two concurrent links in advance to some extent. In some cases, the second AP may further select the transmission direction of the second link based on an actual service requirement in a BSS of the second AP. This has better flexibility and higher concurrent transmission efficiency.

The following further describes the embodiments of this application with reference to more accompanying drawings. For ease of description, in the embodiments of this application, descriptions are provided with reference to the application scenario shown in FIG. 1.

Figure 4:
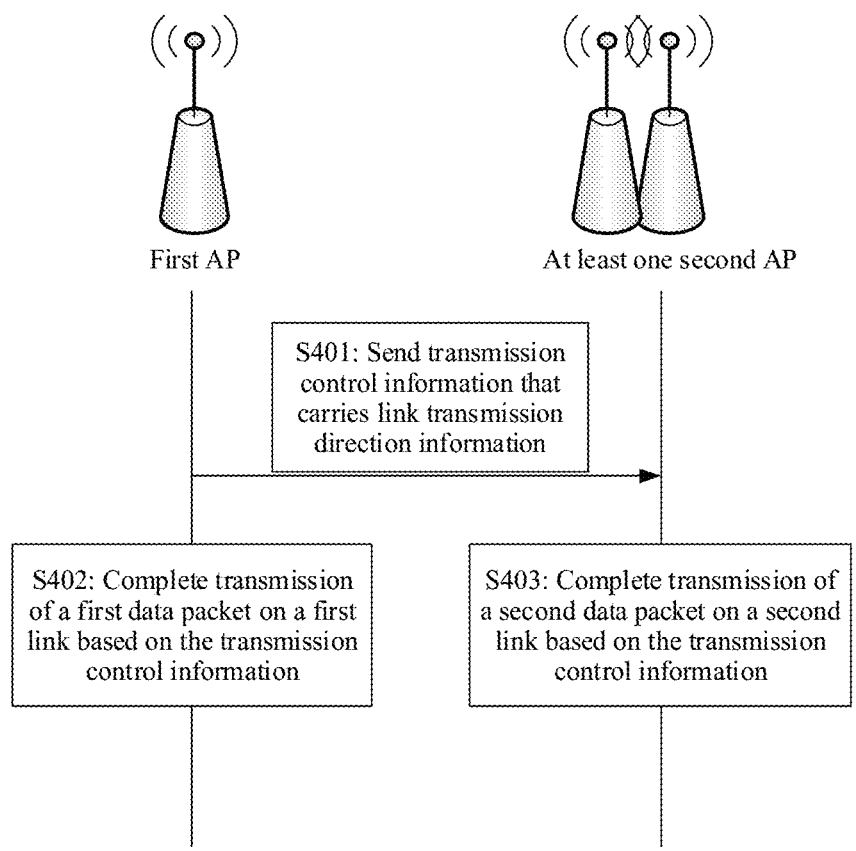
FIG. 4 shows a coordinated AP transmission method according to an embodiment of this application.

FIG. 4 shows a coordinated AP transmission method according to an embodiment of this application. The method includes the following steps.

S401: A first AP sends transmission control information to at least one second AP.

The transmission control information includes link transmission direction information used to indicate transmission directions of at least two links to the at least one second AP, and the at least two links may include a first link and at least one second link. One second link corresponds to one second AP.

It may be understood that the link transmission direction information may be used to indicate transmission directions of one first link and one second link. The link transmission direction information may alternatively be used to indicate transmission directions of one link and at least two second links.

In one case, an example in which the transmission control information is used to indicate transmission directions of two links is used for description. The two links are a first link and a second link. The transmission control information is used to indicate transmission directions of the first link and the second link to the second AP. Therefore, the transmission control information includes link transmission direction information used to indicate transmission directions of the first link and the second link to the second AP such that the second AP determines the transmission direction of the second link based on the link transmission direction information.

The first link is a link between the first AP and at least one first STA, and the at least one first STA is associated with the first AP. The second link is a link between the second AP and at least one second STA or is a link between at least two second STAs in the at least one second STA, and the at least one second STA is associated with the second AP. To be specific, the first link may be a transmission link in which the first AP participates, for example, may include an uplink and a downlink. The second link may be a link in which the second AP participates and that is concurrent with the first link, for example, may include an uplink, a downlink, and a device-to-device D2D link. Referring to FIG. 1, for example, the first link may be an uplink or a downlink between an AP 1 and a station associated with the AP 1, for example, may be a link between the AP 1 and a STA 1. The second link may be an uplink or a downlink between an AP 2 and a station associated with the AP 2, or may be a D2D link between any two stations in a BSS 2, for example, a D2D link between a STA 4 and a STA 5.

In the other case, the link transmission direction information is used to indicate transmission directions of one link and at least two second links. The first link is a link between the first AP and at least one first STA, and the at least one first STA is associated with the first AP. One of two second links is a link between a second AP (one of two second APs) and at least one second STA or is a link between at least two second STAs in the at least one second STA, and the at least one second STA is associated with the second AP. The other of the two second links is a link between a second AP (the other of the two second APs) and at least one second STA or is a link between at least two second STAs in the at least one second STA. Referring to FIG. 1, for example, this system may further include another second AP, the another second AP (which for example, may be referred to as an AP 3), and the another second AP (AP 3) belongs to a BSS 3 (not shown in FIG. 1). The first link may be an uplink or a downlink between an AP 1 and a station associated with the AP 1, for example, may be a link between the AP 1 and a STA 1. One second link (which is referred to as a second link 1 for case of description) may be an uplink or a downlink between an AP 2 and a station associated with the AP 2, or may be a D2D link between any two stations in a BSS 2, for example, a D2D link between a STA 4 and a STA 5. The other second link (which is referred to as a second link 2 for ease of description) may be an uplink or a downlink between the AP 3 and a station associated with the AP 3, or may be a D2D link between any two stations in the BSS 3.

The first AP and the at least one second AP in this embodiment of this application may belong to one coordinating set. Further, how the first AP and the at least one second AP establish the coordinating set is not limited in this embodiment of this application.

S402: The first AP completes transmission of a first data packet on the first link based on the link transmission direction information.

The first AP completes the transmission of the first data packet on the first link based on the transmission direction that is of the first link and that is indicated in the link transmission direction information. The first data packet may be an uplink data packet and is sent by a STA to the first AP, or may be a downlink data packet and is sent by the first AP to a STA. For example. FIG. 1 is used as an example. The first data packet may be an uplink data packet sent by the STA 1 to the AP 1, or a downlink data packet sent by the AP 1 to the STA 1.

In a WLAN communications system, a data packet may also be referred to as a physical layer (PHY) protocol data unit (PPDU). In this application document, the physical layer protocol data unit and the data packet are interchangeably used.

S403: The second AP completes transmission of a second data packet on the second link based on the link transmission direction information.

The at least one second AP that receives the transmission control information sent by the first AP may obtain the link transmission direction information from the transmission control information, to determine the transmission direction of the first link and the transmission direction of the second link, and complete the transmission of the second data packet on the second link. The second data packet may be uplink data sent by a STA to the second AP, downlink data sent by the second AP to a STA, or D2D data between any two STAs associated with the second AP. For example, FIG. 1 is used as an example. The second data packet may be an uplink data packet sent by the STA 4 to the AP 2, a downlink data packet sent by the AP 2 to the STA 4, or data sent by the STA 4 to the STA 5.

Optionally, a time range occupied by the first data packet transmitted on the first link is the same as a time range occupied by the second data packet transmitted on the second link. It may be understood as that a sending time of the first data packet is the same as a sending time of the second data packet and duration of the first data packet is the same as duration of the second data packet. For example, the first data packet and the second data packet occupy a same quantity of orthogonal frequency-division multiplexing (OFDM) symbols, and have a same sending time. The first data packet and the second data packet occupy a same time range such that mutual interference can be reduced when the two data packets are sent.

It should be noted that, based on an operating principle of a transceiver, "the same sending time" in this embodiment of this application is substantially "the same", and provided that the foregoing processing is roughly the same in a time dimension as a whole, there is no need to strictly limit that sending of the first data packet PPDU and sending of the second data packet PPDU have no time difference. In addition, in the solution in this embodiment of this application, the first AP and the at least one second AP "simultaneously" send the first PPDU and the second PPDU such that SR can be fully implemented, and transmission efficiency and a throughput can be improved. This is beneficial.

The transmission directions that are of the first link and the at least one second link and that are indicated using the link transmission direction information may include a plurality of combinations.

In a first case, the link transmission direction information is used to indicate transmission directions of one first link and one second link, and the transmission directions indicated using the link transmission direction information may include but are not limited to any one of the following: both the first link and the second link are uplinks, both the first link and the second link are downlinks, the first link is an uplink, and the second link is a downlink, the first link is a downlink, and the second link is an uplink, the first link is an uplink, and the second link is an uplink/a downlink, the first link is a downlink, and the second link is an uplink/a downlink, the first link is an uplink, and the second link is device-to-device D2D, or the first link is a downlink, and the second link is device-to-device D2D.

Optionally, the transmission control information may further include one or a combination of the following: information about an identifier of the second AP, used to indicate the second AP, where it may be understood that the information about the identifier may be a media access control (MAC) address of the second AP, or may be an identifier (ID) of a basic service set in which the second AP is located, a first end time identifier, used to indicate an end time of the first data packet, where the end time of the first data packet helps the second AP that receives the transmission control information determine the transmission time of the second data packet, on the second link, that is concurrent with the first data packet, and a second end time identifier, where when the first data packet on the first link is an uplink data packet sent by the station to the first AP, before the first data packet is sent, the first AP further sends a trigger frame to the station associated with the first AP, to trigger the station to send the first data packet, and the second end time identifier may be used to indicate an end time of the trigger frame. When the first data packet on the first link is a downlink data packet, a value of the second end time identifier may be an invalid value, to indicate that no trigger frame exists. Alternatively, the transmission control information may not include the identifier.

FIG. 5 shows an example structure of transmission control information. It may be understood that the transmission control information may be sent to the at least one second AP as an independent frame, or may be carried in another frame as a field. This is not limited in this embodiment of this application. The transmission control information includes a transmission direction indication field, used to indicate the transmission directions of the first link and the second link, where several bits may be used to indicate the transmission directions of the first link and the second link, an address field of the second AP, used to indicate the second AP, which may be a MAC address of the second AP or an ID of a BSS in which the second AP is located, where FIG. 1 is used as an example, and the address field of the second AP may be a MAC address of the AP 2, or may be an ID of the BSS 2, a data transmission end time field, used to indicate the end time of the first data packet sent on the first link, and a trigger frame end time field, used to indicate, when the first data packet is an uplink data packet, the end time of the trigger frame that is sent by the first AP and that is used to trigger the first data packet. When the first data packet is a downlink data packet, the field may be set to an invalid value.

In an example, as shown in Table 1, two bits may be used to indicate the transmission directions of the first link and the second link.

TABLE 1

| Transmission direction indication field | Transmission direction indication meaning |
| --- | --- |
| 00 | Both the first link and the second link are ULs |
| 11 | Both the first link and the second link are DLs |
| 01 | The first link is a UL, and the second link is a DL |
| 10 | The first link is a DL, and the second link is a UL |

In another example, as shown in Table 2, three bits may be used to indicate the transmission directions of the first link and the second link.

TABLE 2

| Transmission direction indication field | Transmission direction indication meaning |
| --- | --- |
| 000 | Both the first link and the second link are ULs |
| 011 | Both the first link and the second link are DLs |
| 001 | The first link is a UL, and the second link is a DL |
| 010 | The first link is a DL, and the second link is a UL |
| 100 | The first link is a UL, and the second link is a DL/UL |
| 110 | The first link is a DL, and the second link is a DL/UL |
| 101 | The first link is a DL, and the second link is D2D |
| 111 | The first link is a UL, and the second link is D2D |

It may be understood that, similar to the foregoing solution 1 and solution 2, in a solution 3, four bits may be alternatively used to indicate the transmission directions of the first link and the second link. A specific scenario and a mapping manner of a bit value are similar to those of the solution 1 and the solution 2. Details are not described again. In addition, it may be understood that, in Table 1 and Table 2, the transmission directions to which values of the transmission direction indication field are mapped are permutable, and are not limited to correspondences provided in Table 1 and Table 2.

In still another example, the transmission direction indication field may further include two subfields, and the two subfields respectively indicate the transmission direction of the first link and the transmission direction of the second link. For example, one bit may be used for the first subfield to indicate the transmission direction of the first link, and two bits are used for the second subfield to indicate the transmission direction of the second link. A value of the transmission direction indication field and a transmission direction corresponding to the value may be shown in Table 3:

TABLE 3

| Transmission direction indication field | | |
| --- | --- | --- |
| First subfield | Second subfield | Transmission direction indication meaning |
| 0 | 00 | The first link is a UL, and the second link is a UL |
| 0 | 01 | The first link is a UL, and the second link is a DL |
| 0 | 10 | The first link is a UL, and the second link is a DL/UL |
| 0 | 11 | The first link is a UL, and the second link is D2D |
| 1 | 00 | The first link is a DL, and the second link is a UL |
| 1 | 01 | The first link is a DL, and the second link is a DL |
| 1 | 10 | The first link is a DL, and the second link is a DL/UL |
| 1 | 11 | The first link is a DL, and the second link is D2D |

In a second case, the link transmission direction information is used to indicate transmission directions of one first link and at least two second links. It may be understood that more bits may be used to indicate all combinations of transmission directions of a plurality of links. One first link and two second links are used as an example. The first link includes two cases: a UL and a DL. A second link 1 includes four cases: a UL, a DL, a DL/UL, and D2D, and a second link 2 includes four cases: a UL, a DL, a DL/UL, and D2D. Then, there are a maximum of 32 combinations in total. In this case, at least five bits may be used for the transmission direction indication field to indicate the 32 combinations, and the at least five bits may include one 1-bit first subfield and two 2-bit second subfields. Alternatively, a relatively small quantity of bits may be used to indicate some combinations of transmission directions of a plurality of links. In an example, it is assumed that the second link 1 and the second link 2 have a same transmission direction and both include four cases: a UL, a DL, a DL/UL, and D2D, the first link includes two cases: a UL and a DL, and eight cases in the 32 combinations are obtained. In this case, at least three bits may be used to indicate eight combinations. For example, the eight combinations are indicated using Table 2. In another example, the second link 1 and the second link 2 have a same transmission direction and both include two cases: a UL and a DL, the first link includes two cases: a UL and a DL, and four combinations in the 32 combinations are obtained. In this case, the four combinations may be indicated using the method shown in Table 1. Details are not described herein again.

Optionally, the transmission control information may further include one or a combination of the following: information about an identifier of the at least one second AP, used to indicate the at least one second AP, where it may be understood that the information about the identifier may be a MAC address of the at least one second AP, or may be an ID of a basic service set in which the second AP is located, and when the at least one second AP and the first AP belong to a same coordinating set, the information about the identifier of the second AP may alternatively be an ID of the coordinating set, a first end time identifier, used to indicate an end time of the first data packet, where the end time of the first data packet helps the second AP that receives the transmission control information determine the transmission time of the second data packet, on the second link, that is concurrent with the first data packet, and a second end time identifier, where when the first data packet on the first link is an uplink data packet sent by the station to the first AP, before the first data packet is sent, the first AP further sends a first trigger frame to the station associated with the first AP, to trigger the station to send the first data packet, and the second end time identifier may be used to indicate an end time of the first trigger frame. When the first data packet on the first link is a downlink data packet, a value of the second end time identifier may be an invalid value, to indicate that no first trigger frame exists. Alternatively, the transmission control information may not include the identifier. The end time of the first trigger frame helps the second AP determine when the first trigger frame ends, and helps the second AP determine the sending time of the second data packet.

In the second case, the example structure shown in FIG. 5 may also be used for the transmission control information. Compared with the first case, a difference lies in that in an example, an address field of the second AP may include a plurality of subfields, and one subfield is used to indicate one second AP. In another example, a value of an address field of the second AP may alternatively be a broadcast address.

The first AP sends the transmission control information that carries the link transmission direction such that the first AP (a primary AP) can coordinate and plan, in advance, the SR transmission direction of the second link that is concurrent with the first link, and the second AP (a secondary AP) can randomly select a service transmission direction based on a service requirement. This has higher flexibility.

Embodiment 2: An example in which link transmission direction information is used to indicate transmission directions of one first link and one second link, the transmission direction of the first link is a UL, and the transmission direction of the second link may be a DL, a UL, a DL/UL, or D2D is used to describe a coordinated multi-access-point transmission method provided in an embodiment of this application.

FIG. 6 shows a processing procedure on a first AP side used when a first link is a UL, including the following steps.

S601: A first AP sends transmission control information.

The transmission control information is used to indicate that the first link is UL transmission.

Step S601 is similar to step S401. For the transmission control information, refer to the corresponding description in Embodiment 1. Details are not described herein again.

It may be understood that, when the first link is a UL, that the first AP completes transmission of a first data packet on the first link based on link transmission direction information includes the following steps.

S602: The first AP sends a first trigger frame after a first time interval.

S603: The first AP receives the first data packet after a first time interval.

Optionally, the method further includes S604: Return a block acknowledgment after a first time interval.

In S602, the first trigger frame is sent by the first AP to a station associated with the first AP, to trigger the station associated with the first AP to send an uplink first data packet to the first AP. The first time interval may be a Short Interframe Space (SIFS).

Figure 7A:
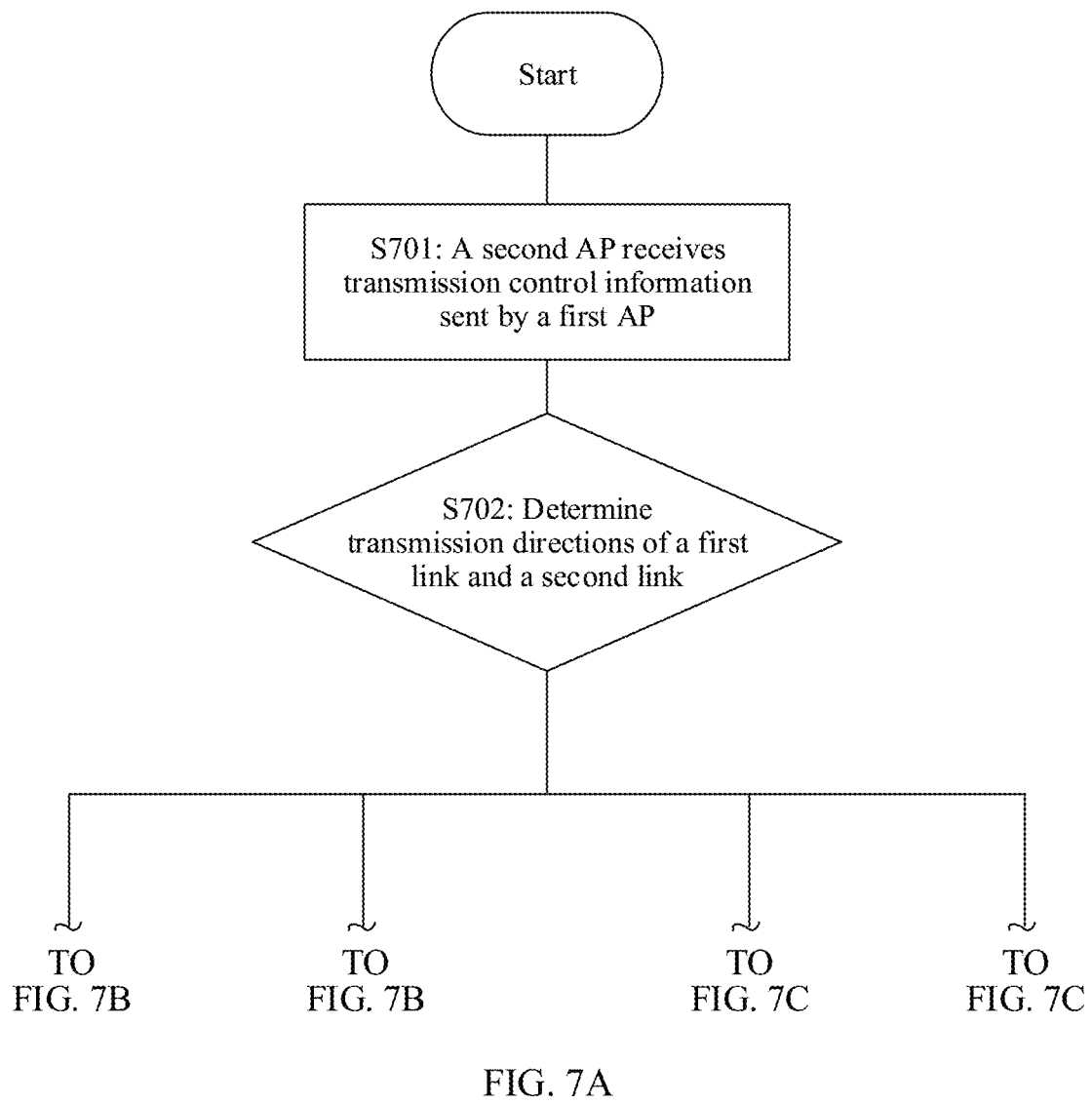
FIG. 7A.
Figure 7B:
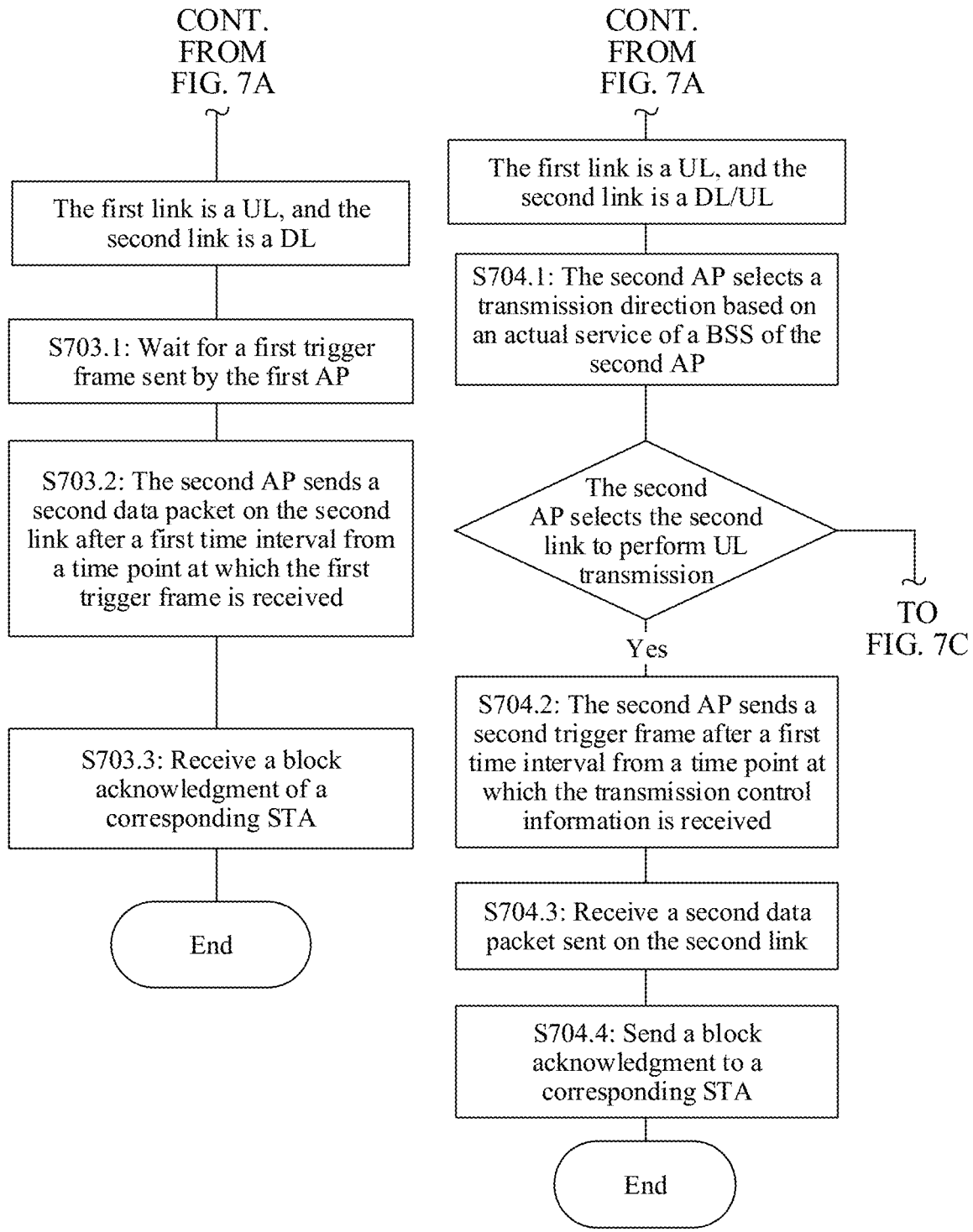
FIG. 7B, and FIG. 7C show a processing procedure on a second AP side used when a first link is a UL.
Figure 7C:
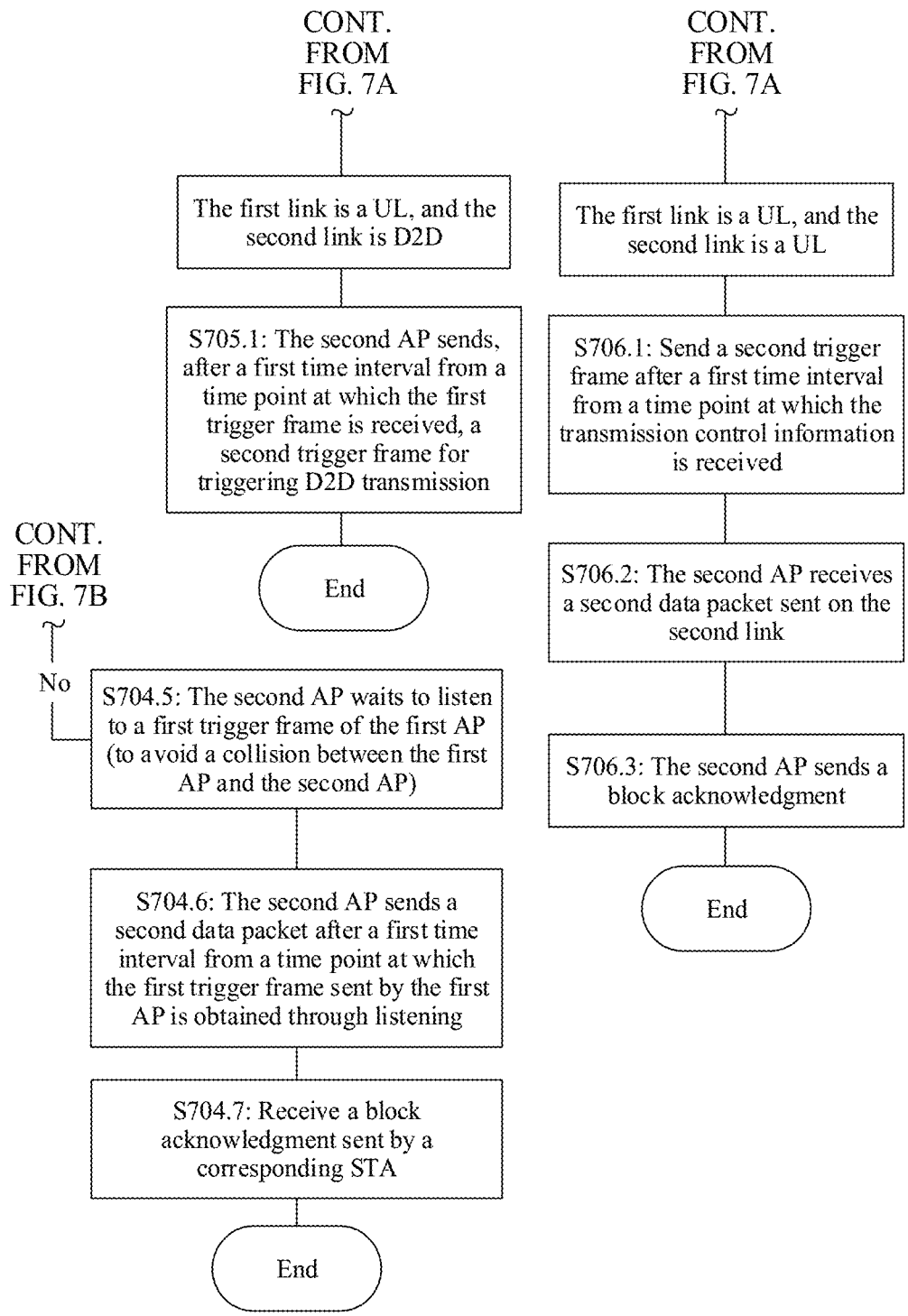

FIG. 7A, FIG. 7B, and FIG. 7C shows a processing procedure on a second AP side, including the following steps.

S701: A second AP receives transmission control information sent by a first AP.

The transmission control information is used to indicate that a first link is a UL. The second AP obtains signaling information such as a link transmission direction indication from the transmission control information.

S702: The second AP determines transmission directions of the first link and a second link.

The second AP may determine the transmission direction of the first link and the transmission direction of the second link based on the link transmission direction indication. In this embodiment, the second AP may determine that the first link is a UL.

The second AP determines a specific transmission direction of the second link based on the link transmission direction indication, for example, one of a DL, a UL, a DL/UL, and D2D. When transmission directions of the second link that are determined by the second AP are different, processing methods of the second AP are also different. The following separately describes several possible transmission directions of the second link.

In a first case, the second AP determines that the first link is a UL and the second link is a DL, jumps to step S703.1, and performs steps of a branch in which S703.1 is located.

Further, when the second AP determines that the first link is a UL and the second link is a DL, the second AP waits for a first trigger frame sent by the first AP, and the second AP sends a second data packet on the second link after a first time interval from a time point at which the second AP receives the first trigger frame. The first time interval may be a SIFS. Further, a station that is of the second AP and that receives the second data packet sends block acknowledgment information to the second AP.

Optionally, when a length of the second data packet is not long enough, the second AP may pad a data bit based on a first end time identifier in the transmission control indication such that an end time of the second data packet is the same as an end time of a first data packet.

Figure 8A:
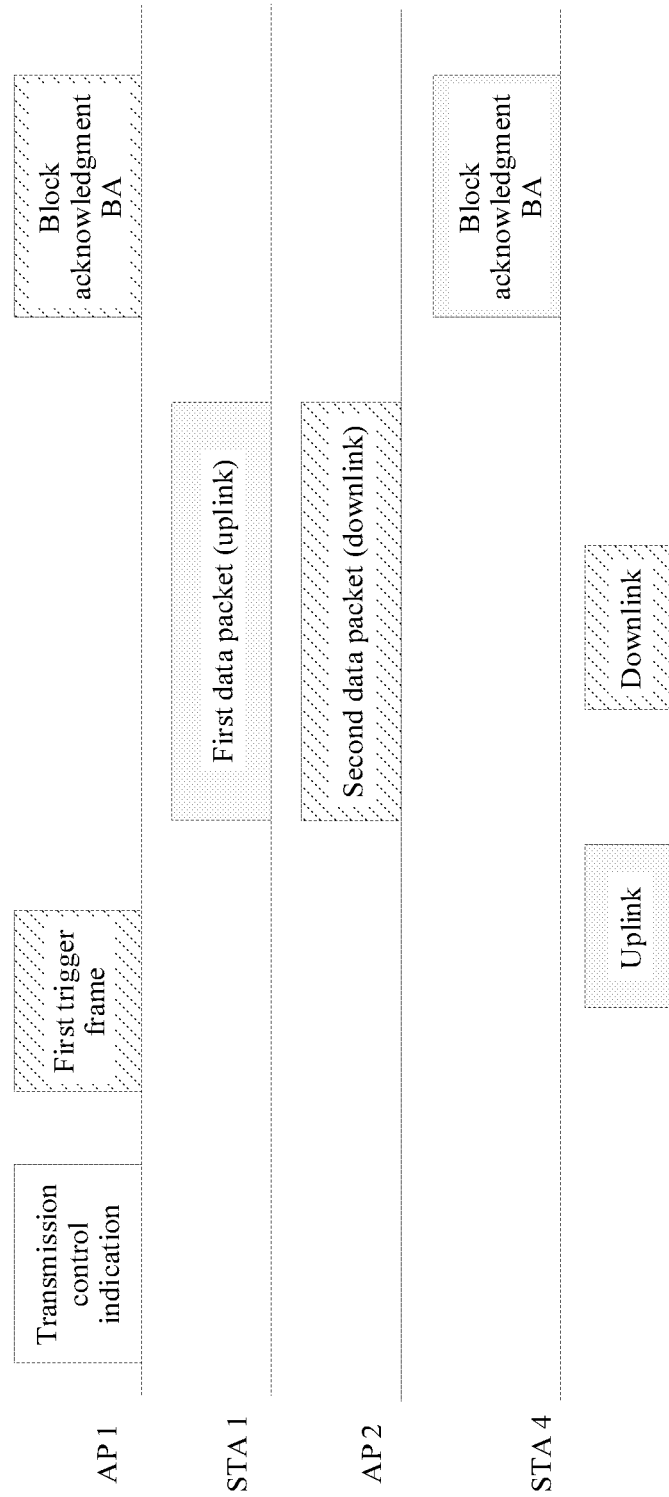
FIG. 8A is a schematic diagram of a time sequence used when a first link is a UL and a second link is a downlink (DL)

For example, an example in which an AP 1 is the first AP and an AP 2 is the second AP is used. FIG. 8A is a schematic diagram of a time sequence used when a first link is a UL and a second link is a DL.

In a second case, when the second AP determines that the first link is a UL and the second link is a DL/UL, the second AP performs steps of a branch in which S704.1 is located. Further, when the second AP determines that the first link is a UL and the second link is a DL/UL, the second AP may select the transmission direction of the second link based on an actual service requirement of a BSS in which the second AP is located.

When the second AP selects UL transmission as the transmission direction of the second link, the second AP sends a second trigger frame after a first time interval from a time point at which the second AP receives the transmission control information sent by the first AP, where the second trigger frame is used to trigger a station associated with the second AP to perform uplink transmission. Further, the second AP receives a second data packet, and sends block acknowledgment information to the STA that sends the second data packet, to indicate a receiving status of the second data packet to the STAs.

Figure 8B:
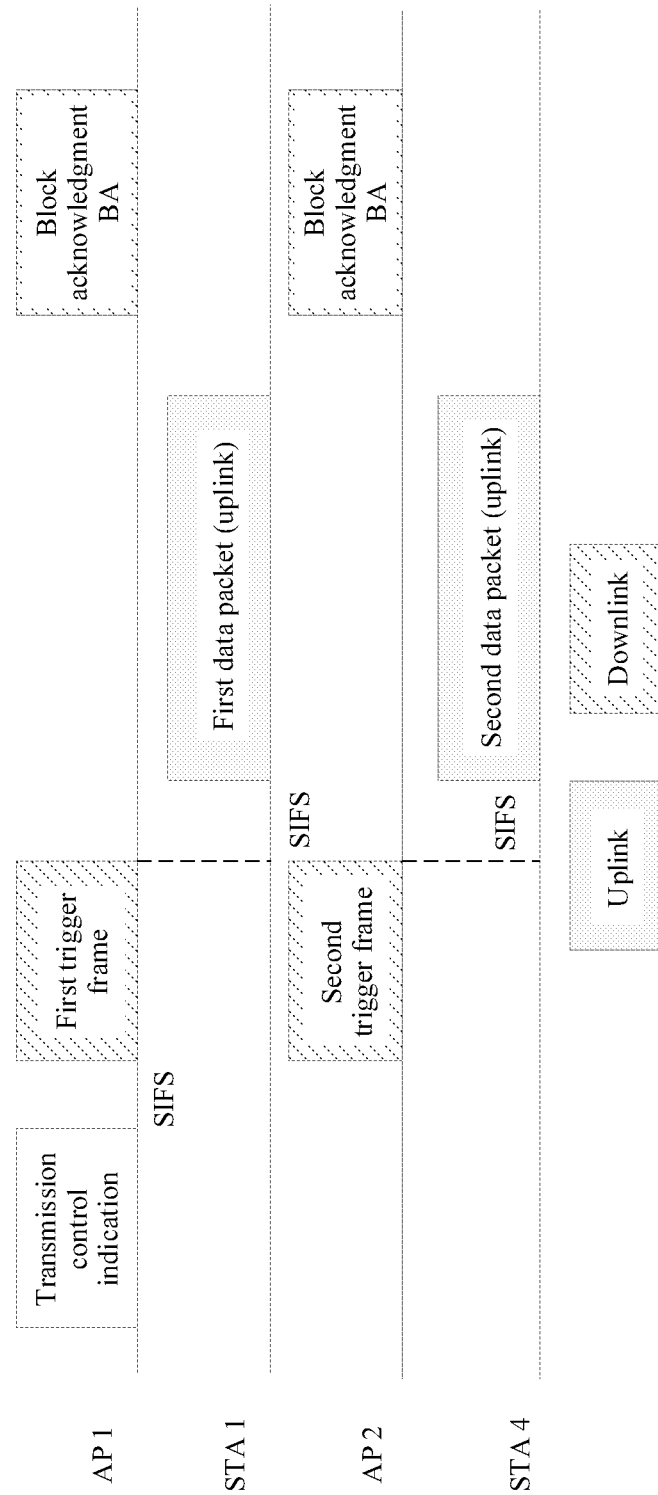
FIG. 8B is a schematic diagram of a time sequence used when a first link is a UL, a second link is a DL/UL, and a second AP selects a UL as the second link based on an actual service requirement.

For example, an example in which an AP 1 is the first AP and an AP 2 is the second AP is used. FIG. 8B is a schematic diagram of a time sequence used when a first link is a UL, a second link is a DL/UL, and an AP 2 selects a UL as the second link based on an actual service requirement.

When the second AP selects a DL as the transmission direction of the second link, the second AP sends a second data packet after a first time interval from a time point at which the second AP obtains, through listening, a first trigger frame sent by the first AP. Further, a station that receives the second data packet sends a block acknowledgment to the second AP. Optionally, when a length of the second data packet is not long enough, the second AP may pad a data bit based on a first end time identifier in the transmission control indication such that an end time of the second data packet is the same as an end time of a first data packet.

For example, an example in which an AP 1 is the first AP and an AP 2 is the second AP is used. A schematic diagram of a time sequence used when a first link is a UL, a second link is a DL/UL, and an AP 2 selects a DL as the second link based on an actual service requirement may also be shown in FIG. 8A.

In a third case, when the second AP determines that the first link is a UL and the second link is D2D, the second AP performs a step of a branch in which S705.1 is located. Further, the second AP sends, after a first time interval from a time point at which the second AP receives a first trigger frame, a second trigger frame to stations associated with the second AP, to trigger the stations to perform D2D transmission.

Figure 8C:
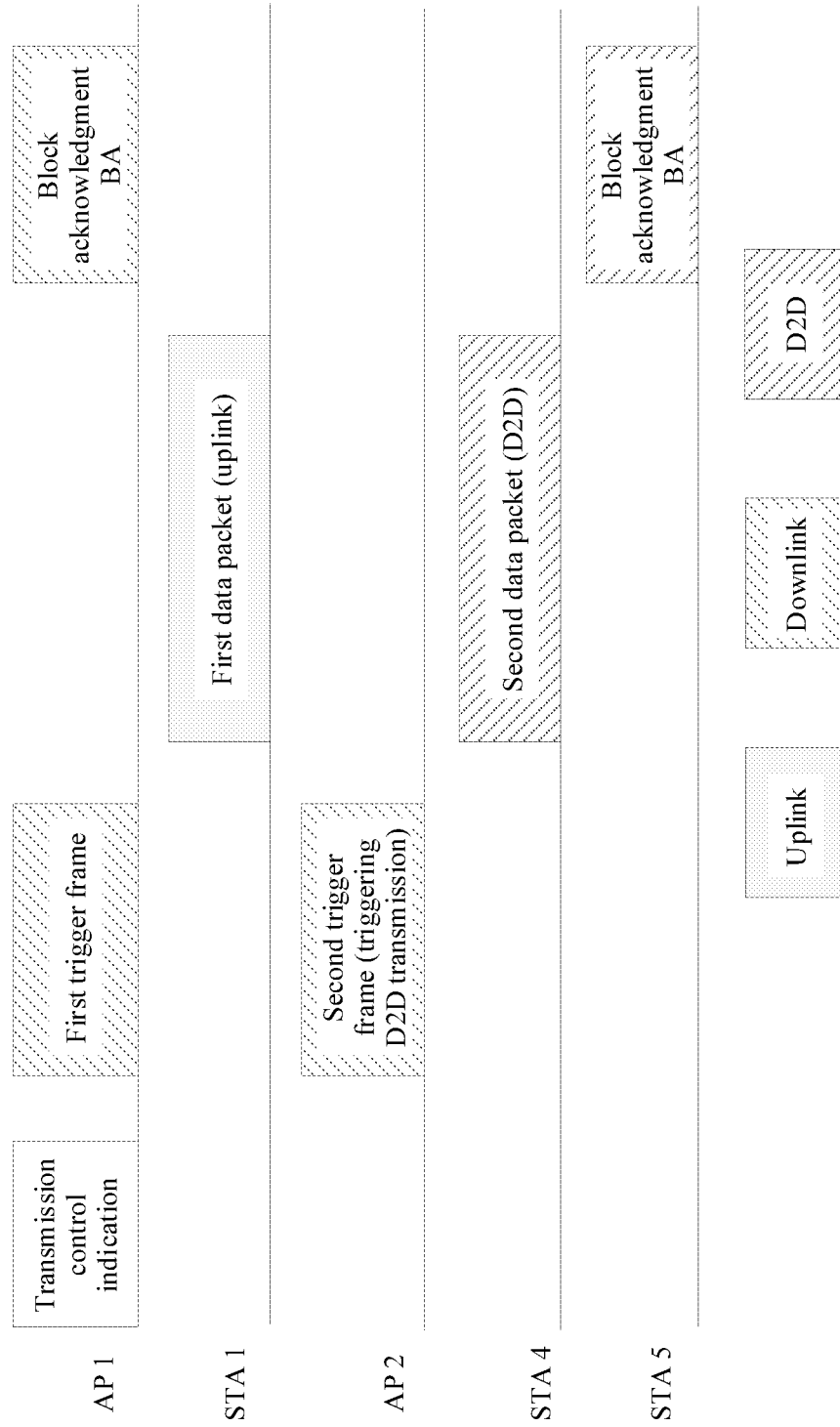
FIG. 8C is a schematic diagram of a time sequence used when a first link is a UL and a second link is D2D.

For example, an example in which an AP 1 is the first AP and an AP 2 is the second AP is used. FIG. 8C is a schematic diagram of a time sequence used when a first link is a UL and a second link is D2D.

In a fourth case, when the second AP determines that the first link is a UL and the second link is also a UL, the second AP performs steps of a branch in which S706.1 is located. Further, a second trigger frame is sent after a first time interval from a time point at which the transmission control information is received, to trigger a station of the second AP to send uplink data. The second AP receives a second data packet sent by the station, and further feeds back block acknowledgment (BA) information to the STAs.

For example, an example in which an AP 1 is the first AP and an AP 2 is the second AP is used. A schematic diagram of a time sequence used when a first link is a UL and a second link is a UL may also be shown in FIG. 8B.

The first AP sends the transmission control information that carries the link transmission direction such that the first AP (a primary AP) can coordinate and plan, in advance, the SR transmission direction of the second link that is concurrent with the first link, and the second AP (a secondary AP) can randomly select a service transmission direction based on a service requirement. This has higher flexibility.

Embodiment 3: An example in which link transmission direction information is used to indicate transmission directions of one first link and one second link, the transmission direction of the first link is a DL, and the transmission direction of the second link may be a DL, a UL, a DL/UL, or D2D is used to describe a coordinated multi-access-point transmission method provided in an embodiment of this application.

Figure 9A:
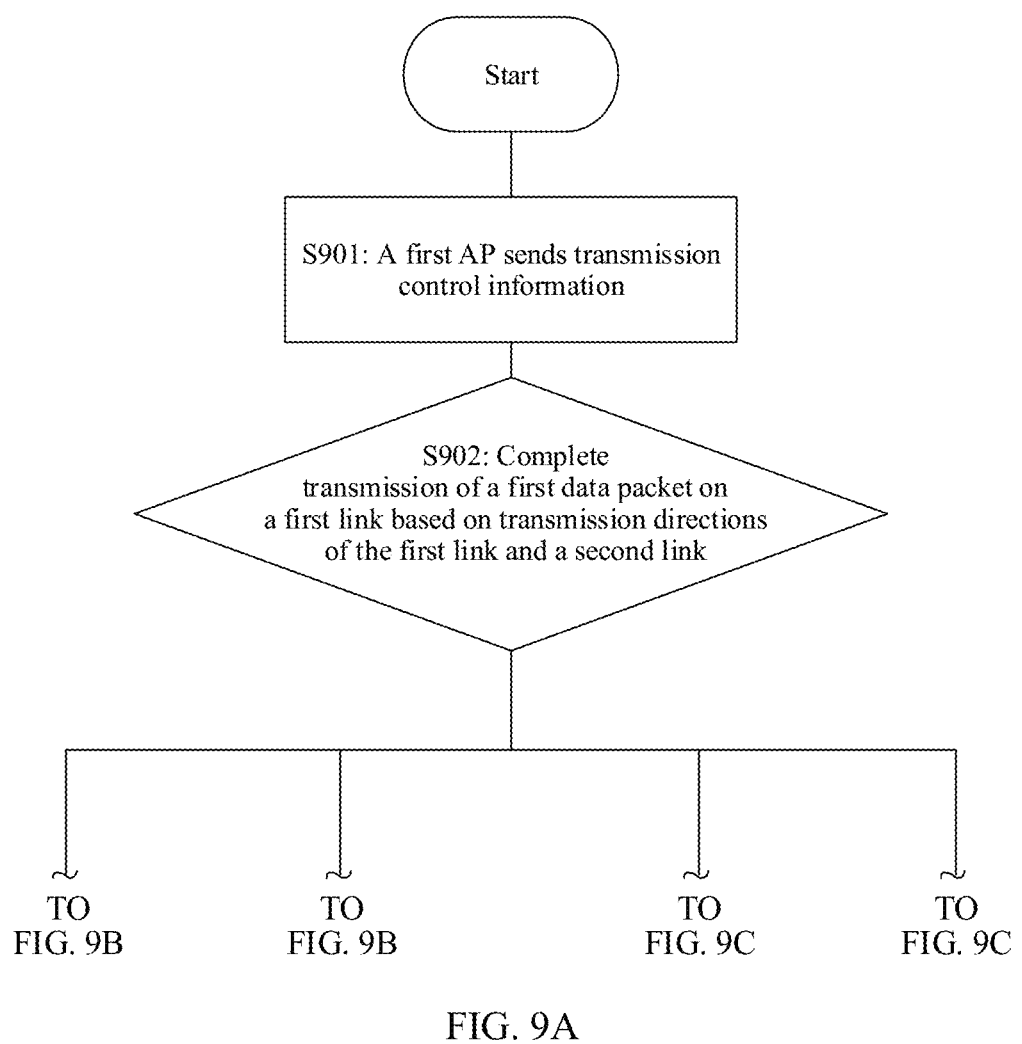
FIG. 9A, FIG. 9B, and FIG. 9C show a processing procedure on a first AP side used when a first link is a DL.
Figure 9B:
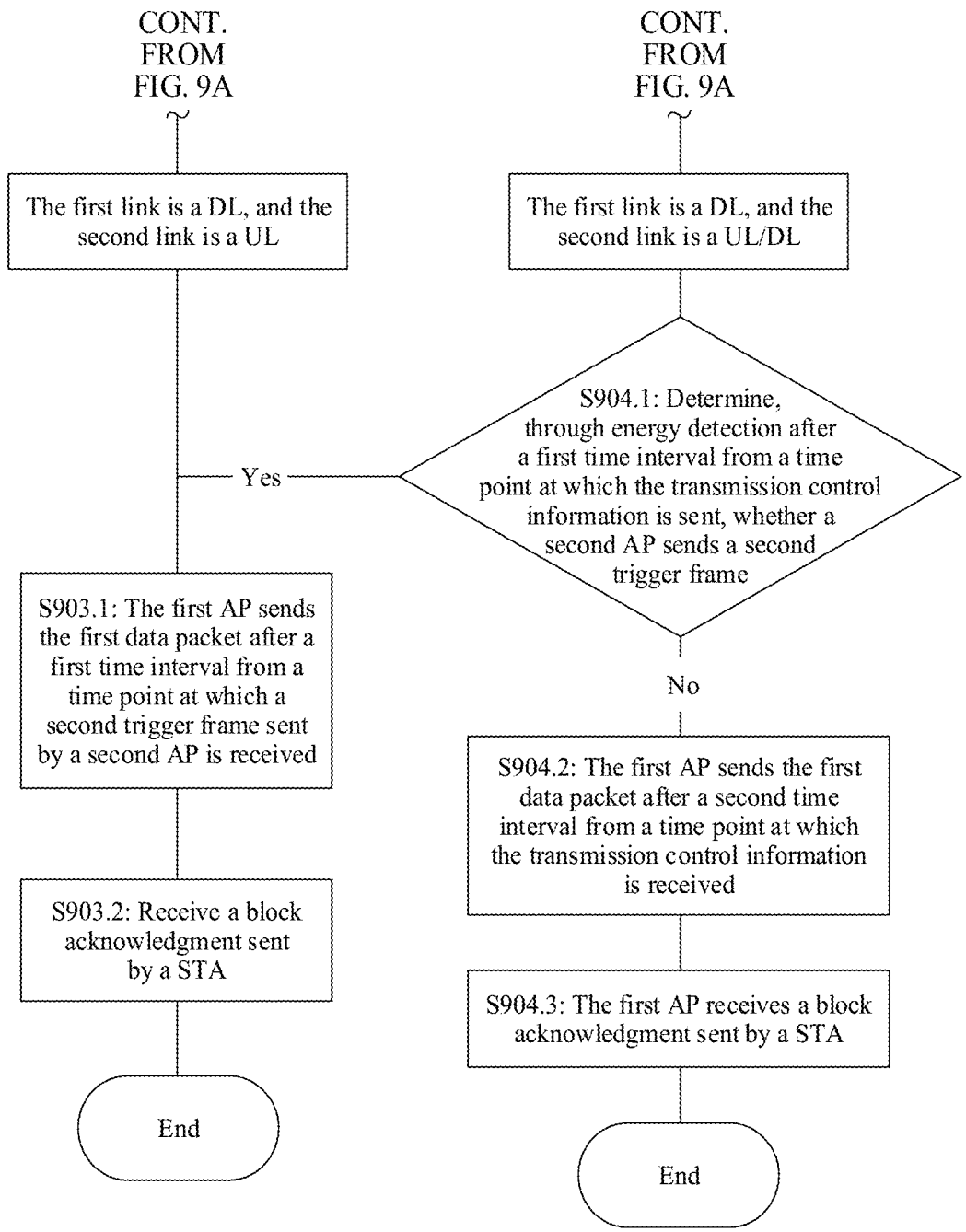
Figure 9C:
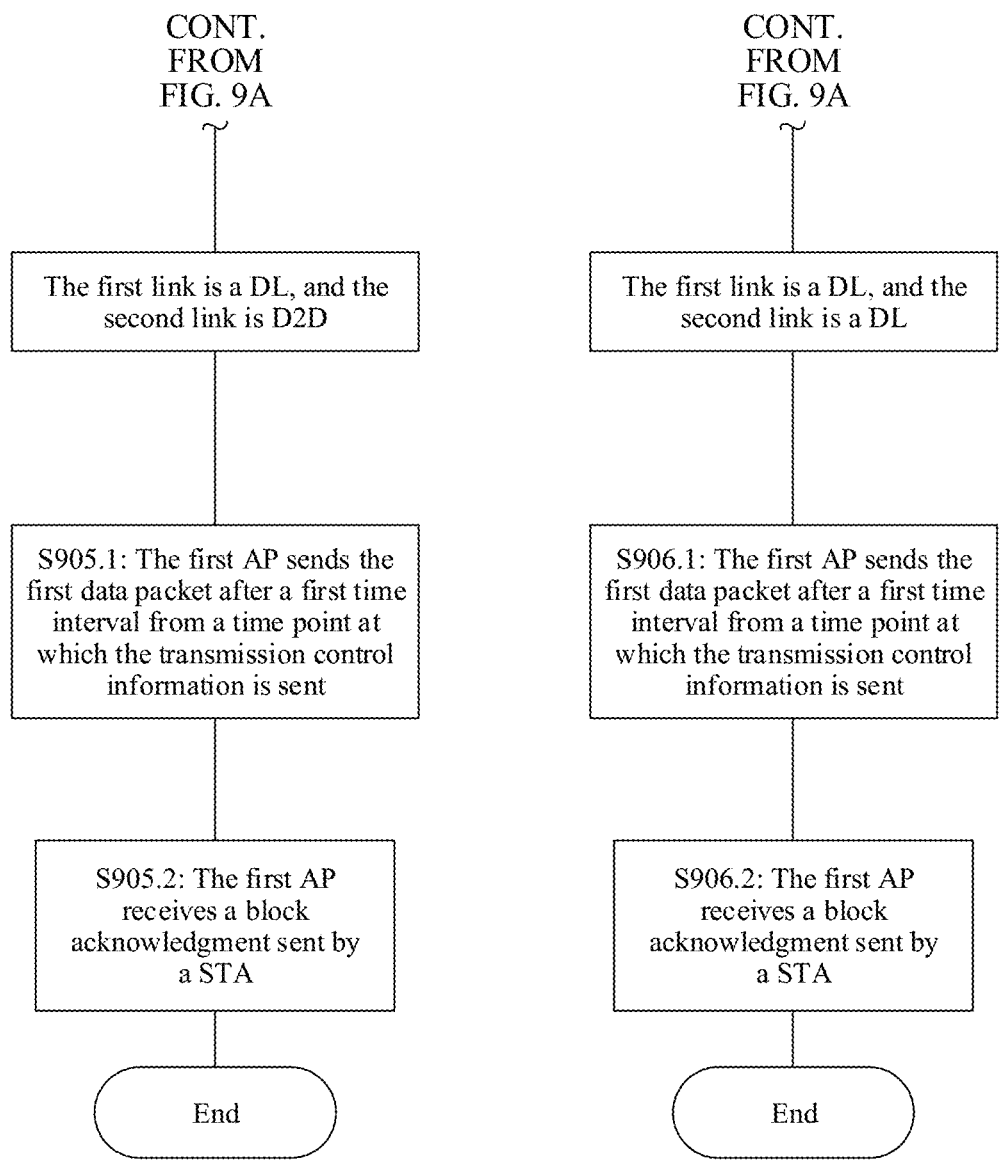

FIG. 9A, FIG. 9B, and FIG. 9C show a processing procedure on a first AP side used when a first link is a DL, including the following steps.

S901: A first AP sends transmission control information to a second AP.

The transmission control information is used to indicate that the first link is DL transmission, and a transmission direction of a second link may be a DL, a UL, a DL/UL, or D2D.

Step S901 is similar to step S401, and details are not described herein again.

When transmission directions of the second link are different, processing methods of the first AP are also different. The following separately describes several possible transmission directions of the second link.

In a first case, when a transmission direction of the first link is a DL, and a transmission direction of the second link is a UL, steps of a branch in which S903.1 is located are performed.

Further, the first AP may send, after a first time interval from a time point at which the first AP receives a second trigger frame sent by the second AP, a first data packet to a station associated with the first AP, and further receive a block acknowledgment sent by the STAs.

Figure 10A:
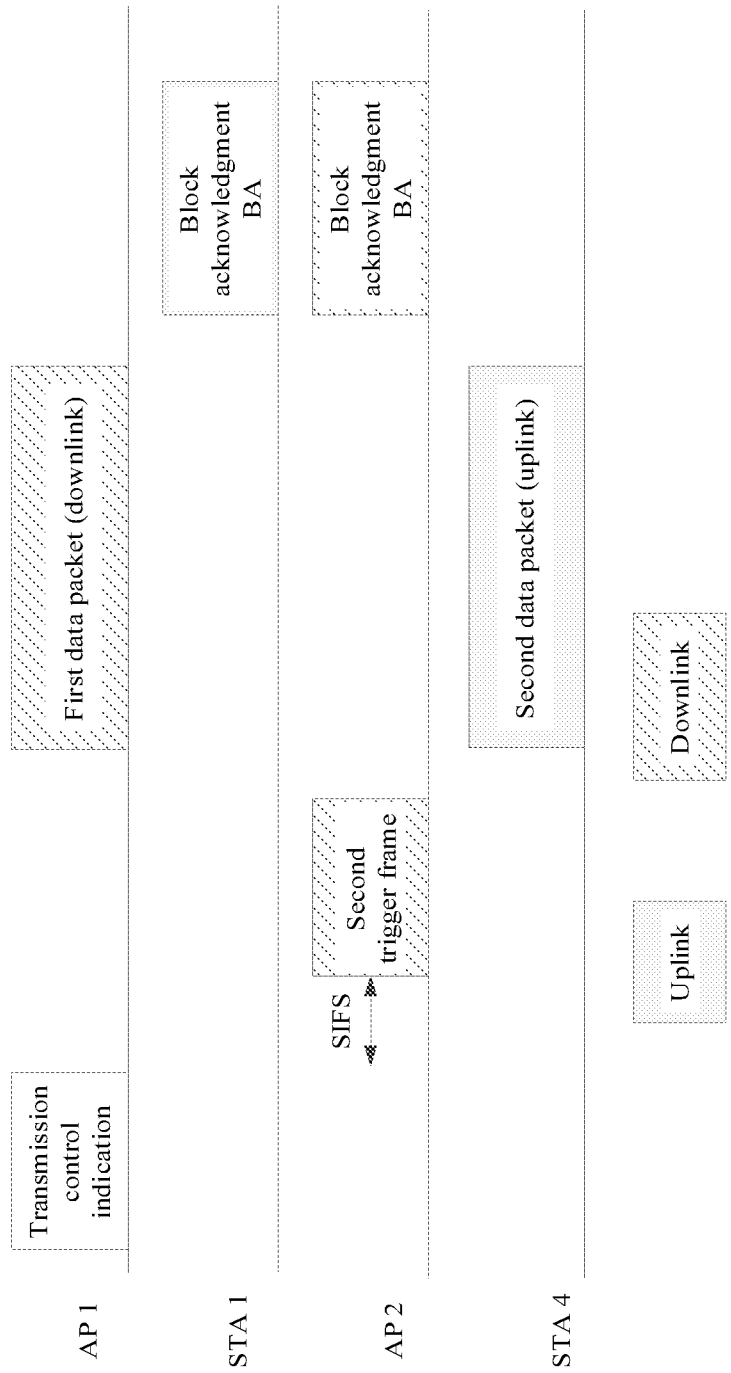
FIG. 10A is a schematic diagram of a time sequence used when a first link is a DL and a second link is a UL.

For example, an example in which an AP 1 is the first AP and an AP 2 is the second AP is used. FIG. 10A is a schematic diagram of a time sequence used when a first link is a DL and a second link is a UL.

In a second case, when a transmission direction of the first link is a DL, and a transmission direction of the second link is a DL/UL, the second AP performs steps of a branch in which S904.1 is located. Further, when the second link is a DL/UL, the first AP may determine, through energy detection after a first time interval from a time point at which the first AP sends the control information, whether the second AP sends a second trigger frame.

When detecting the second trigger frame sent by the second AP, the first AP may determine that the second link is a UL, and the first AP performs steps of a branch in which S903.1 is located. This is similar to the first case.

When the first AP does not detect the second trigger frame sent by the second AP, the first AP may determine that the second link is a DL, and the first AP sends a first data packet after a second time interval from a time point at which the transmission control information is received. Further, a STA that receives the first data packet sends a block acknowledgment to the first AP. The second time interval may be a point coordination interframe space (PIFS).

Figure 10B:
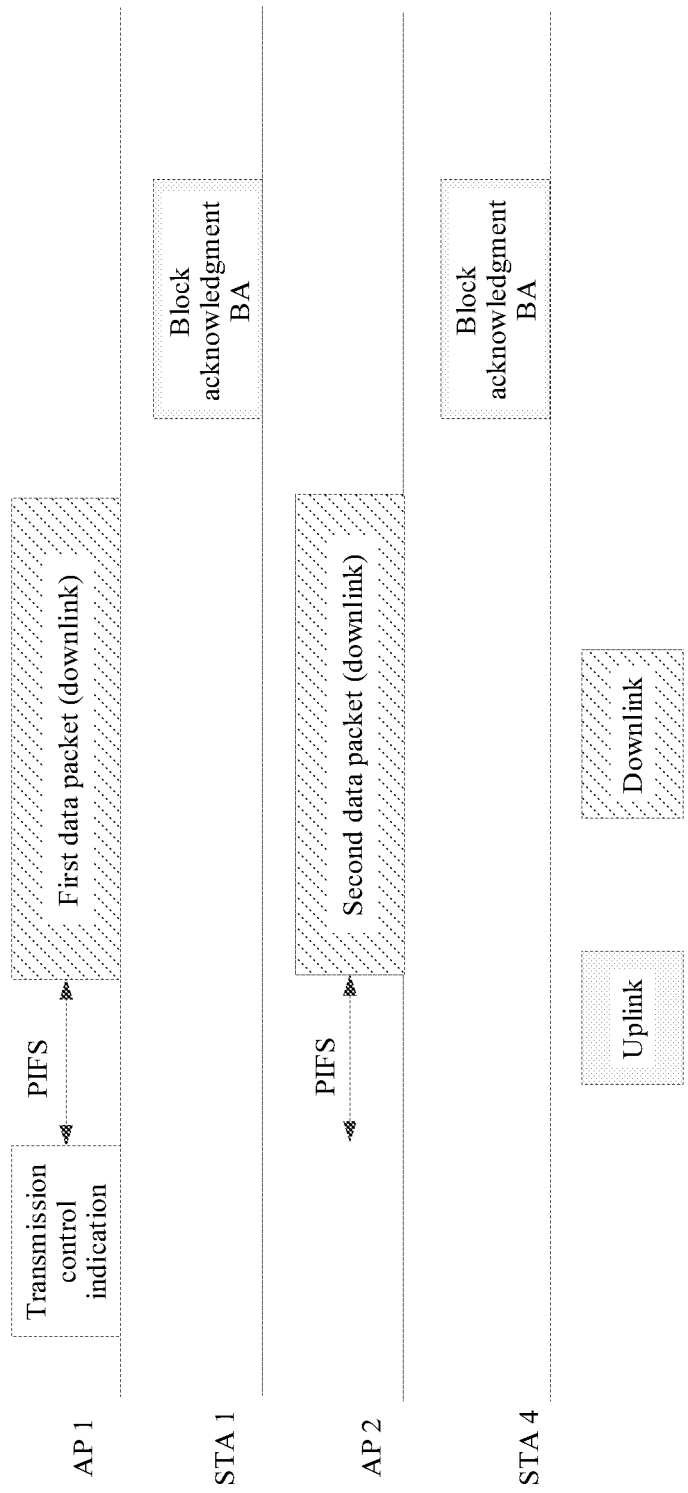
FIG. 10B is a schematic diagram of a time sequence used when a first link is a DL, a second link is a DL/UL, and an AP 2 selects a DL as the second link based on an actual service requirement.

For example, an example in which an AP 1 is the first AP and an AP 2 is the second AP is used. FIG. 10B is a schematic diagram of a time sequence used when a first link is a DL, a second link is a DL/UL, and an AP 2 selects a DL as the second link based on an actual service requirement.

In a third case, when the first link is a DL, and the second link is D2D, the first AP performs steps of a branch in which S905.1 is located. Further, the first AP sends a first data packet after a first time interval from a time point at which the first AP sends the transmission control information, and further, the first AP receives a block acknowledgment sent by a STA.

Figure 10C:
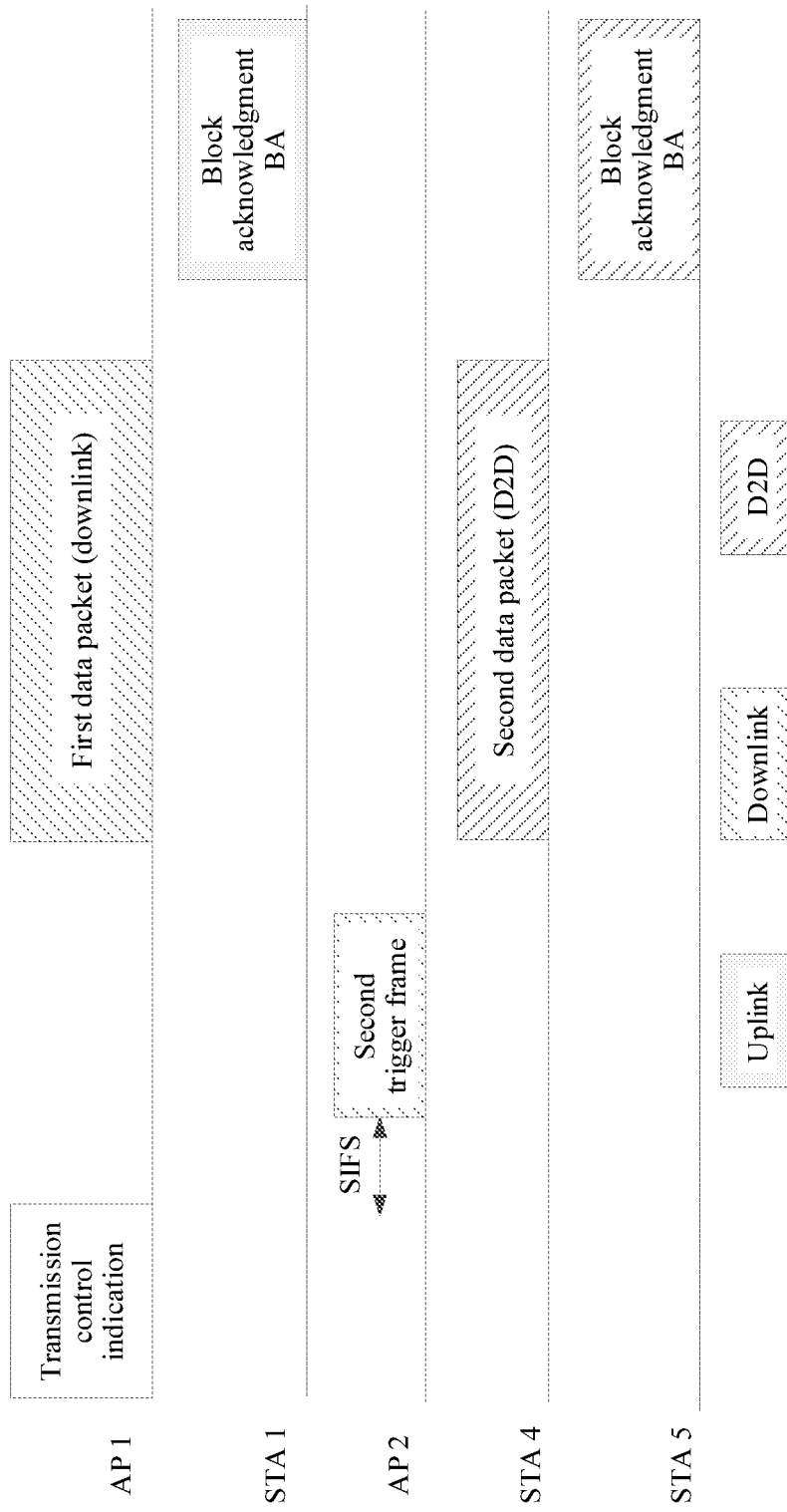
FIG. 10C is a schematic diagram of a time sequence used when a first link is a DL and a second link is D2D.

For example, an example in which an AP 1 is the first AP and an AP 2 is the second AP is used. FIG. 10C is a schematic diagram of a time sequence used when a first link is a DL and a second link is D2D.

In a fourth case, when the first link is a DL, and the second link is also a DL, the second AP performs steps of a branch in which S906.1 is located. Further, the first AP sends a first data packet after a first time interval from a time point at which the transmission control information is received, and further, the first AP receives a block acknowledgment sent by a STA.

Figure 10D:
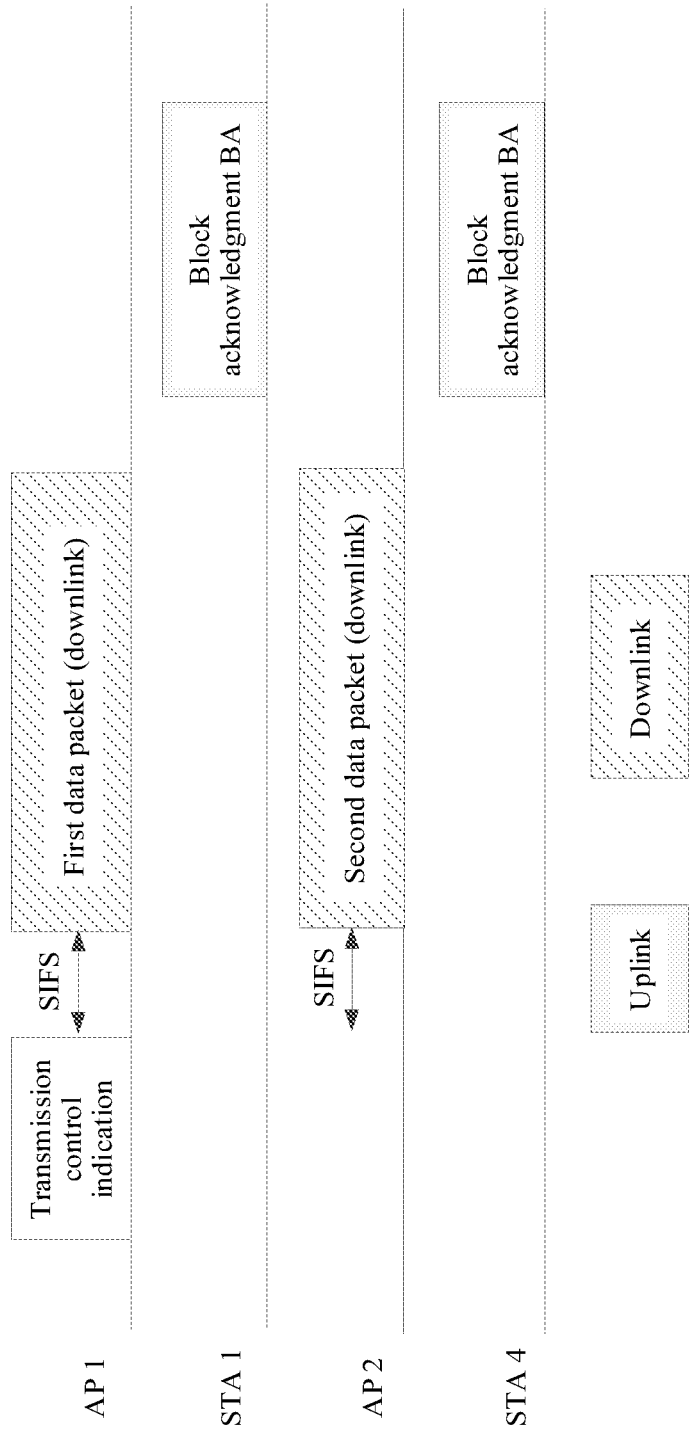
FIG. 10D is a schematic diagram of a time sequence used when a first link is a DL and a second link is a DL.

For example, an example in which an AP 1 is the first AP and an AP 2 is the second AP is used. A schematic diagram of a time sequence used when a first link is a DL and a second link is a DL may be shown in FIG. 10D.

Figure 11A:
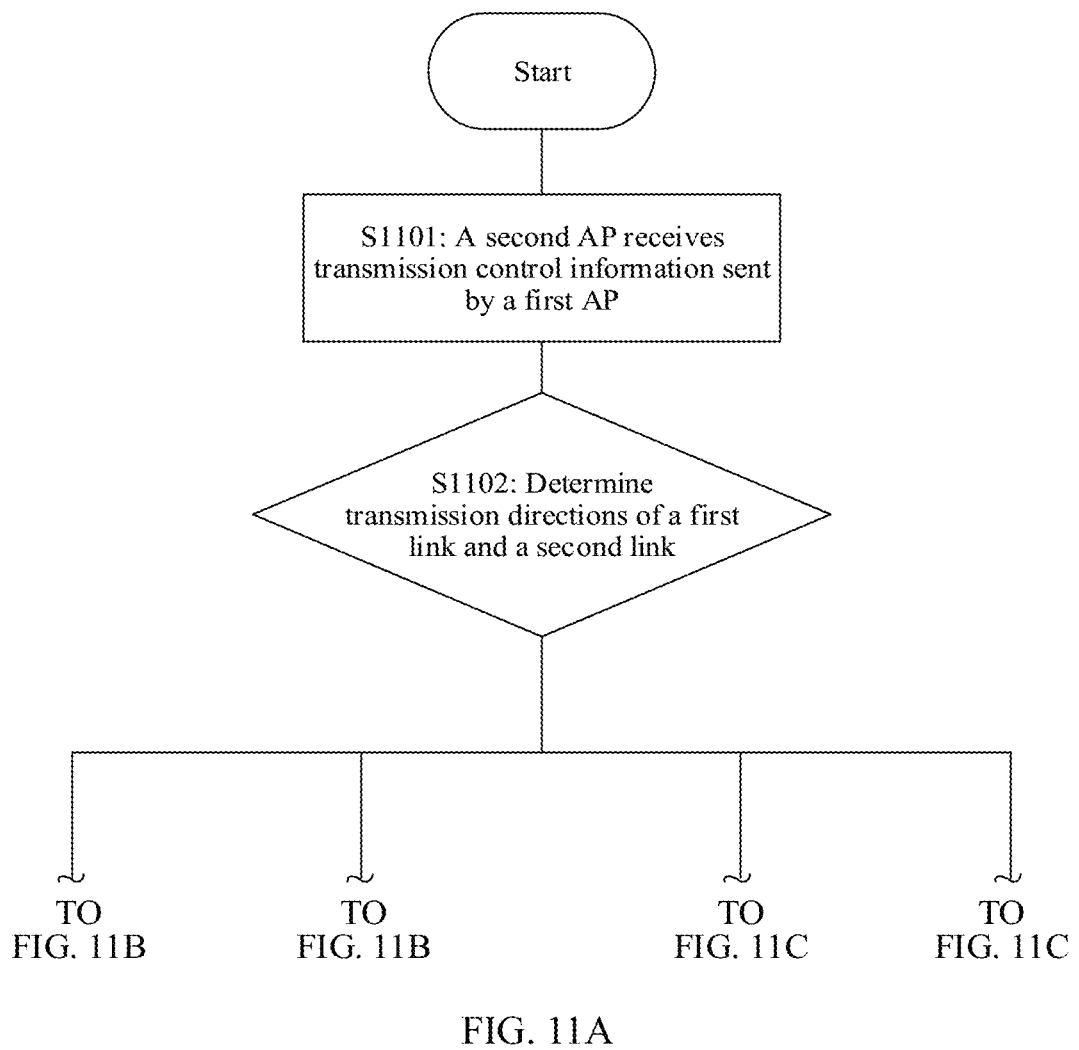
FIG. 11A.
Figure 11B:
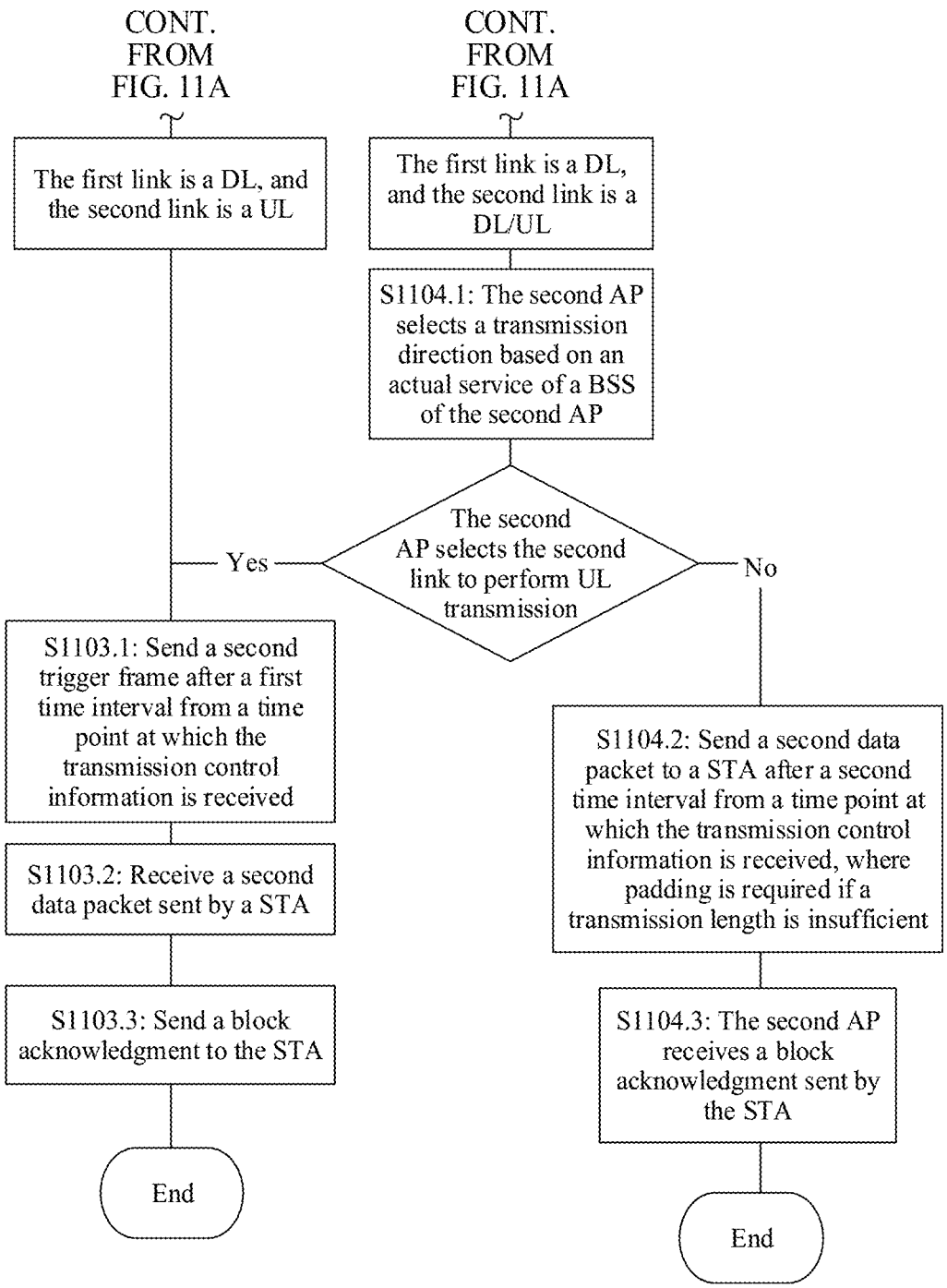
FIG. 11B, and FIG. 11C show a processing procedure on a second AP side used when a first link is a DL.
Figure 11C:
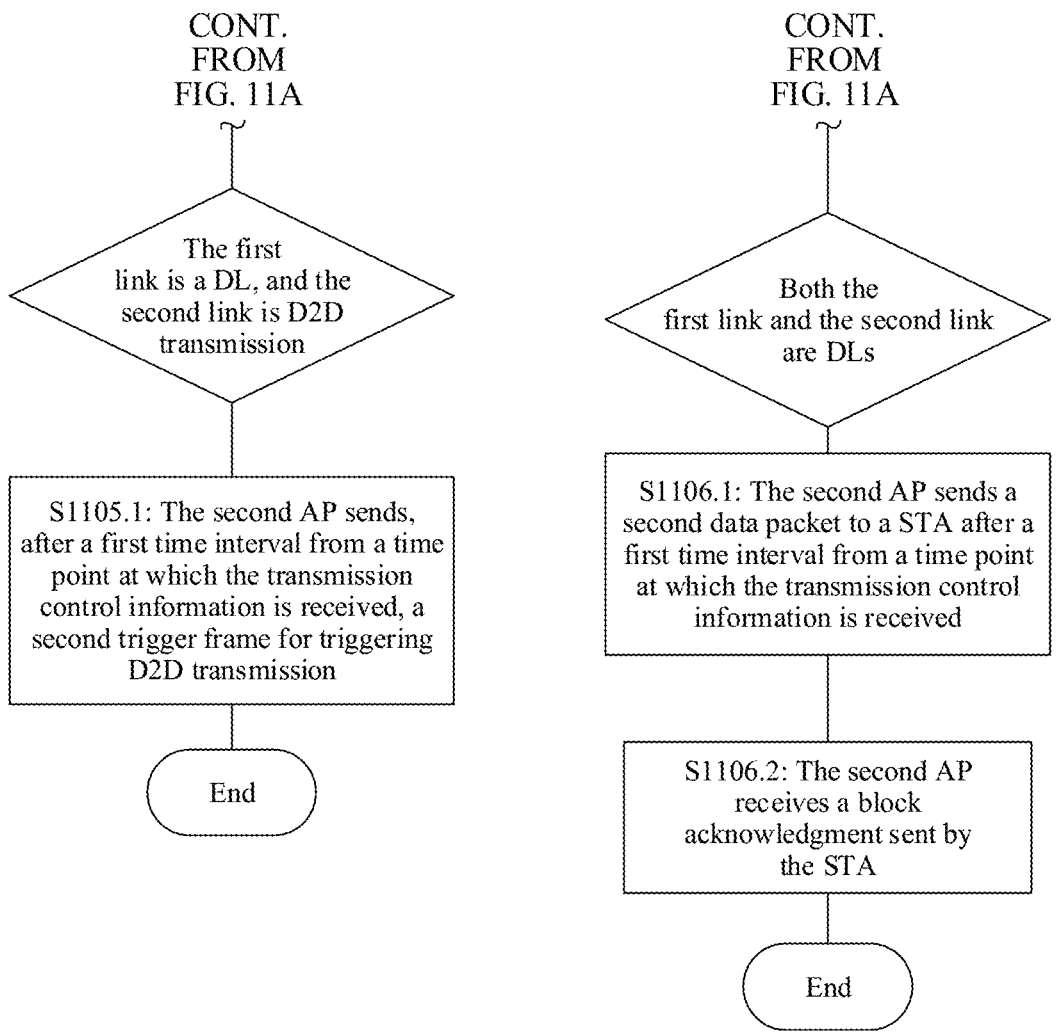

FIG. 11A. FIG. 11B, and FIG. 11C show a processing procedure on a second AP side used when a first link is a DL, including the following steps.

S1101: A second AP receives transmission control information sent by a first AP.

Similar to step S701, the second AP obtains a link transmission direction indication from the transmission control information.

S1102: The second AP determines transmission directions of the first link and a second link.

Based on the link transmission direction indication, the second AP determines that the transmission direction of the first link is a DL, and the second AP determines a specific transmission direction of the second link, for example, one of a DL, a UL, a DL/UL, and D2D. When transmission directions of the second link that are determined by the second AP are different, processing methods of the second AP are also different. The following separately describes several possible transmission directions of the second link.

In a first case, the second AP determines that the first link is a DL and the second link is a UL, jumps to step S1103.1, and performs steps of a branch in which S1103.1 is located.

Further, when the second AP determines that the first link is a DL and the second link is a UL, the second AP sends a second trigger frame after a first time interval from a time point at which the second AP receives the transmission control information, where the second trigger frame is used to trigger a station to perform uplink transmission. Further, the second AP receives a second data packet sent by the STA, and sends a block acknowledgment to the STA.

For example, an example in which an AP 1 is the first AP and an AP 2 is the second AP is used. A schematic diagram of a time sequence used when a first link is a DL and a second link is a UL may be shown in FIG. 10A.

In a second case, when the second AP determines that the first link is a DL and the second link is a DL/UL, the second AP performs steps of a branch in which S1104.1 is located. Further, when the second AP determines that the first link is a DL and the second link is a DL/UL, the second AP may select the transmission direction of the second link based on an actual service requirement of a BSS in which the second AP is located.

When the second AP selects UL transmission as the transmission direction of the second link, the second AP sends a second trigger frame after a first time interval from a time point at which the second AP receives the transmission control information sent by the first AP, and the second AP performs steps of a branch in which S1104.1 is located. This is similar to the first case. Details are not described herein again.

When the second AP selects a DL as the transmission direction of the second link, the second AP sends a second data packet after a second time interval from a time point at which the second AP receives the transmission control information. Further, a station that receives the second data packet sends a block acknowledgment to the second AP. Optionally, when a length of the second data packet is not long enough, the second AP may pad a data bit based on a first end time identifier in the transmission control indication such that an end time of the second data packet is the same as an end time of a first data packet.

For example, an example in which an AP 1 is the first AP and an AP 2 is the second AP is used. A schematic diagram of a time sequence used when a first link is a DL, a second link is a DL/UL, and an AP 2 selects a DL as the second link based on an actual service requirement may also be shown in FIG. 10B.

In a third case, when the second AP determines that the first link is a DL and the second link is D2D, the second AP performs a step of a branch in which S1105.1 is located. Further, the second AP sends, after a first time interval from a time point at which the second AP receives a first trigger frame, a second trigger frame to stations associated with the second AP, to trigger the stations to perform D2D transmission.

For example, an example in which an AP 1 is the first AP and an AP 2 is the second AP is used. A schematic diagram of a time sequence used when a first link is a DL and a second link is D2D is shown in FIG. 10C.

In a fourth case, when the second AP determines that the first link is a DL and the second link is also a DL, the second AP performs steps of a branch in which S1106.1 is located. Further, the second AP sends a second data packet to a STA after a first time interval from a time point at which the second AP receives the transmission control information. Further, the second AP receives a block acknowledgment sent by the STA. Optionally, when a length of the second data packet is not long enough, the second AP may pad a data bit based on a first end time identifier in the transmission control indication such that an end time of the second data packet is the same as an end time of a first data packet.

For example, an example in which an AP 1 is the first AP and an AP 2 is the second AP is used. A schematic diagram of a time sequence used when a first link is a DL and a second link is a DL may also be shown in FIG. 10D.

The first AP sends the transmission control information that carries the link transmission direction such that the first AP (a primary AP) can coordinate and plan, in advance, the SR transmission direction of the second link that is concurrent with the first link, and the second AP (a secondary AP) can randomly select a service transmission direction based on a service requirement. This has higher flexibility.

Different from Embodiment 2 and Embodiment 3, Embodiment 4 shows a coordinated multi-access-point transmission method in a scenario of a plurality of channels.

Embodiment 4: An example in which channels that are occupied by a first data packet on a first link and occupied by a second data packet on a second link include a primary channel and at least one secondary channel is used for description.

Figure 12:
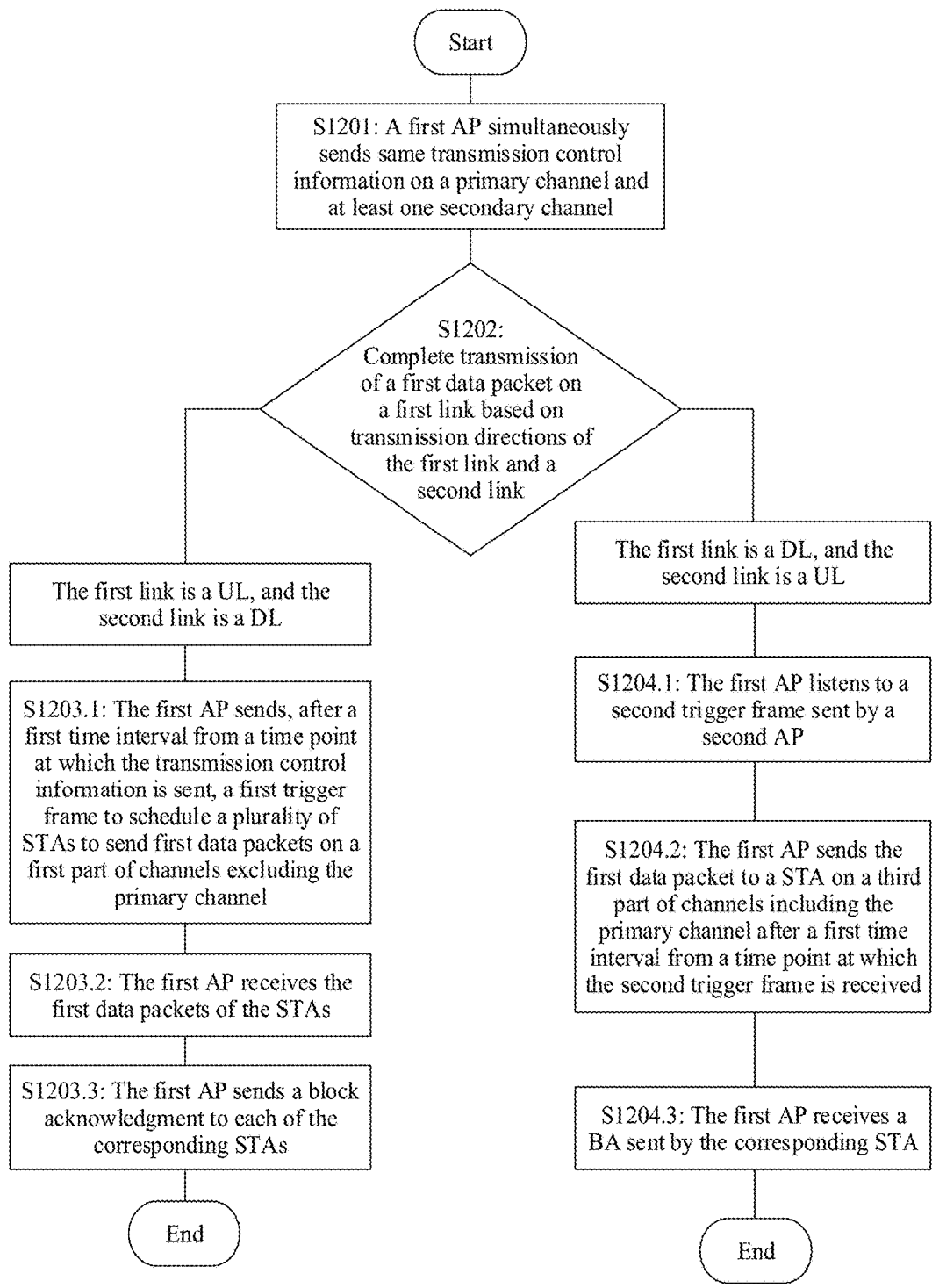
FIG. 12 shows a processing procedure on a first AP side in a case of a plurality of channels.
Figure 13:
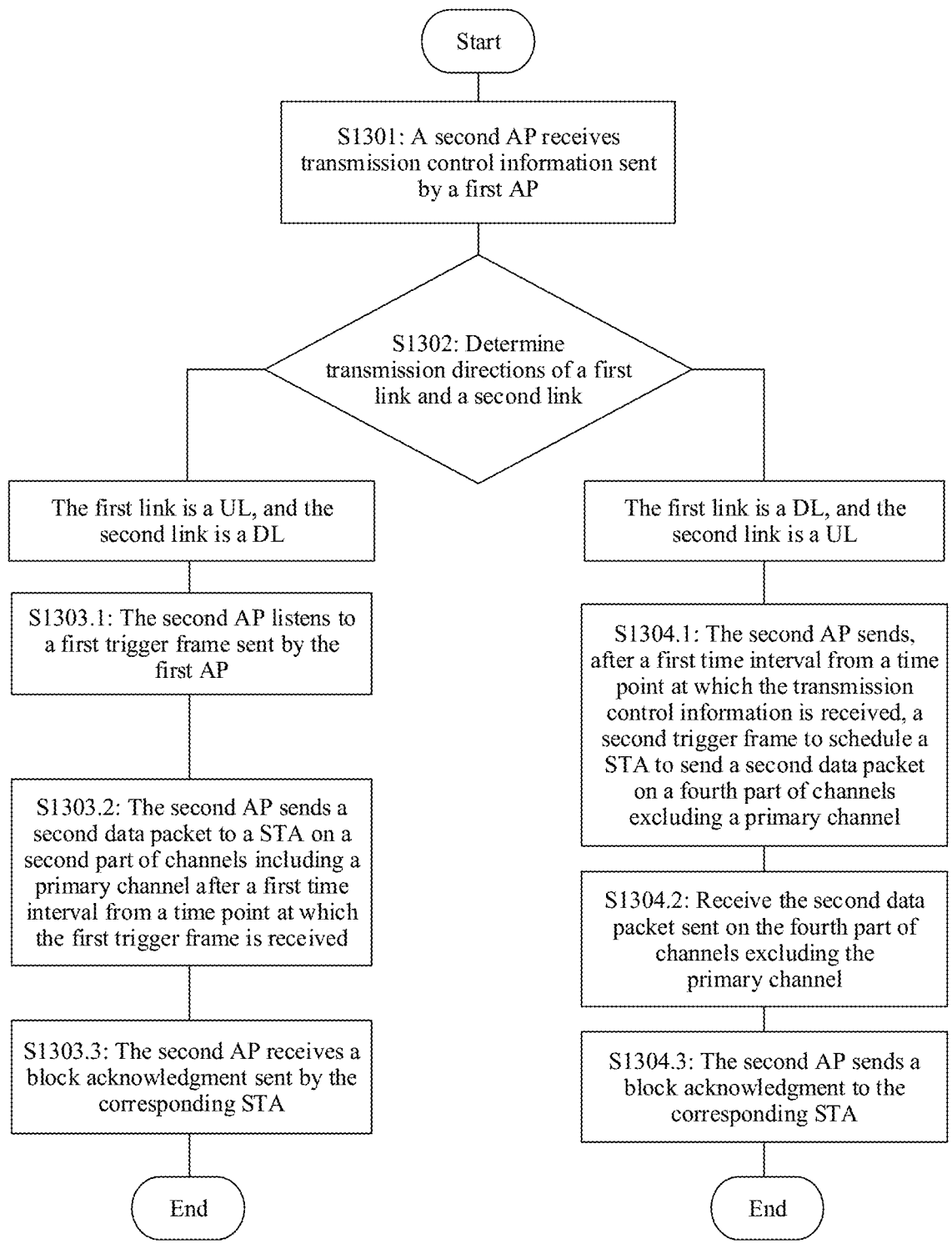
FIG. 13 shows a processing procedure on a second AP side in a case of a plurality of channels.

FIG. 12 shows a processing procedure on a first AP side in a case of a plurality of channels. FIG. 13 shows a processing procedure on a second AP side in a case of a plurality of channels. The processing procedure on the first AP side in FIG. 12 includes the following steps.

S1201: A first AP simultaneously sends same transmission control information on a primary channel and at least one secondary channel.

Further, it may be understood that channels of the first AP and a second AP may include a plurality of channels. Herein, the plurality of channels includes the primary channel and the at least one secondary channel. Therefore, the first AP sends the same transmission control information on the primary channel and the at least one secondary channel.

S1202: The first AP completes transmission of a first data packet on a first link and a second link based on transmission directions of the first link and the second link.

When the first link is a UL and the second link is a DL, the first AP performs steps of a branch in which S1203.1 is located. Further, the first AP sends, after a first time interval from a time point at which the first AP sends the transmission control information, a first trigger frame to schedule a STA to send the first data packet on a first part of channels excluding the primary channel. Correspondingly, the second AP performs steps of a branch in which S1303.1 is located. Further, the second AP listens to the first trigger frame sent by the first AP, and the second AP sends a second data packet to a STA on a second part of channels including the primary channel after a first time interval from a time point at which the second AP receives the first trigger frame. The first part of channels and the second part of channels do not overlap. Optionally, when a length of the second data packet is not long enough, the second AP may pad a data bit based on a first end time identifier in the transmission control indication such that an end time of the second data packet is the same as an end time of the first data packet.

Figure 14A:
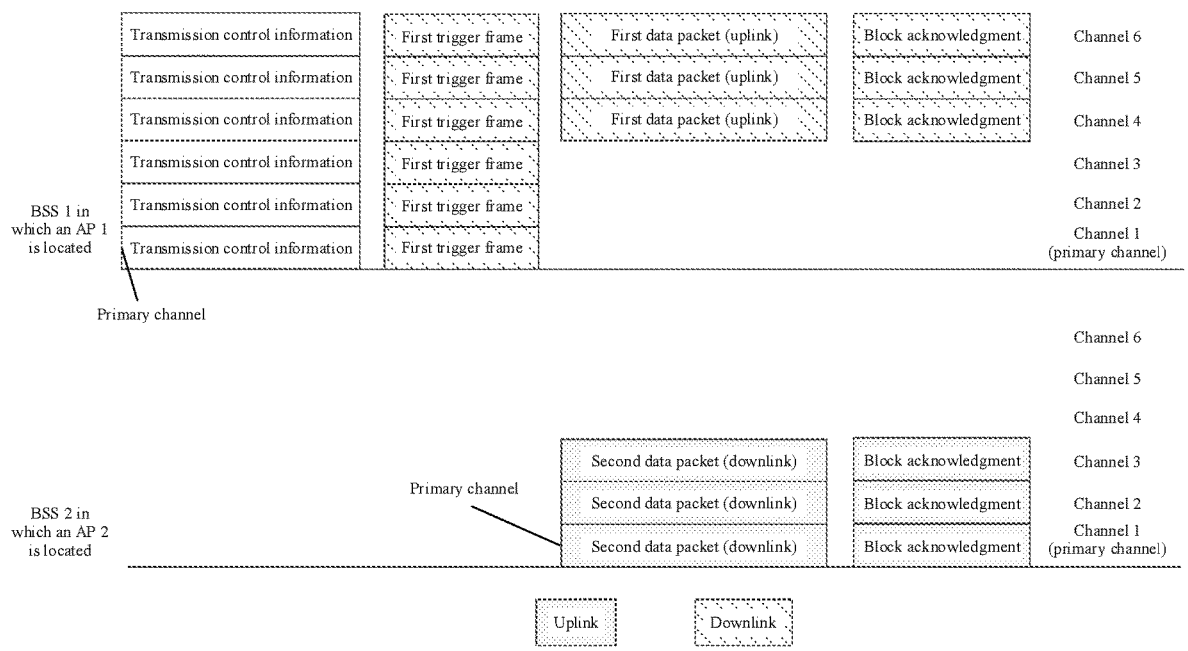
FIG. 14A is a schematic diagram of a time sequence used when a first link is a UL and a second link is a DL.

For example, an example in which an AP 1 is the first AP and an AP 2 is the second AP is used. A schematic diagram of a time sequence used when a first link is a UL, a second link is a DL, a first data packet occupies channels 4, 5, and 6, and a second data packet occupies channels 1, 2, and 3 may be shown in FIG. 14A.

When the first link is a DL and the second link is a UL, the first AP performs steps of a branch in which S1204.1 is located. Further, the first AP listens to a second trigger frame sent by the second AP, and sends, after a first time interval from a time point at which the first AP receives the second trigger frame, the first data packet to a STA on a third part of channels including the primary channel. Correspondingly, the second AP performs steps of a branch in which S1304.1 is located. Further, the second AP sends, after a first time interval from a time point at which the second AP receives the transmission control information, the second trigger frame to schedule a STA to send a second data packet on a fourth part of channels excluding the primary channel, and after receiving the second data packet, the second AP sends a block acknowledgment to the corresponding STA. The third part of channels and the fourth part of channels do not overlap.

Figure 14B:
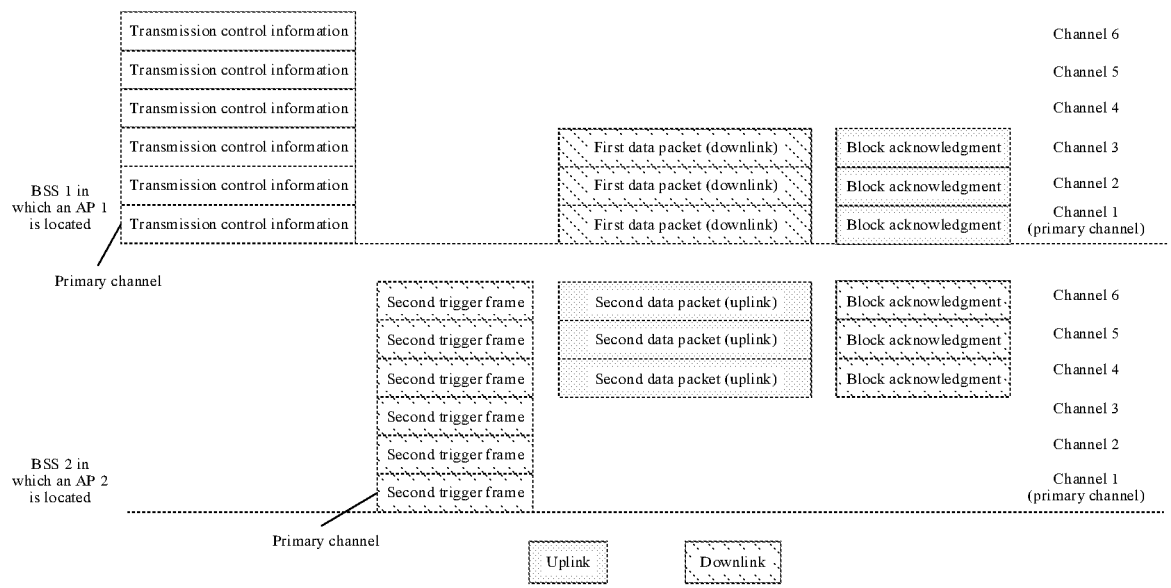
FIG. 14B is a schematic diagram of a time sequence used when a first link is a DL and a second link is a UL.

For example, an example in which an AP 1 is the first AP and an AP 2 is the second AP is used. A schematic diagram of a time sequence used when a first link is a DL, a second link is a UL, a first data packet occupies channels 1, 2, and 3, and a second data packet occupies channels 4, 5, and 6 may be shown in FIG. 14B.

In this embodiment of this application, the solution of this application is further extended to a communication scenario in which a plurality of channels is supported. The first AP sends the transmission control information that carries a link transmission direction such that the first AP (a primary AP) can coordinate and plan, in advance, the transmission direction, on the plurality of channels, of the second link that is concurrent with the first link, and the second AP (a secondary AP) can randomly select a service transmission direction based on a service requirement. This has higher flexibility, improves efficiency of coordinated AP transmission, and further increases a throughput in a high-dense deployment scenario.

Figure 15:
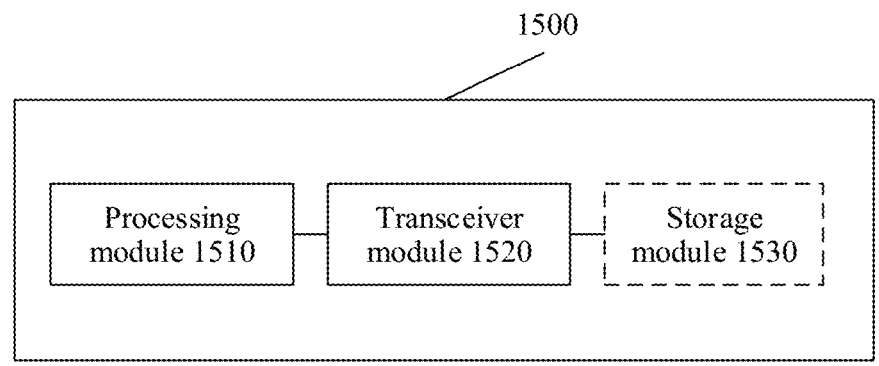
FIG. 15 is a schematic block diagram of an apparatus on a first access point side.

FIG. 15 is a schematic block diagram of an apparatus 1500 on a first access point side according to an embodiment of this application. In an embodiment, the apparatus 1500 shown in FIG. 15 may correspond to the apparatus on the first access point side in the foregoing method embodiments, and may have any function of the first access point in the methods. Optionally, the apparatus 1500 in this embodiment of this application may be the first access point, or may be a chip in the first access point. The apparatus 1500 may include a processing module 1510 and a transceiver module 1520. Optionally, the apparatus 1500 may further include a storage module 1530.

For example, the processing module 1510 may be configured to generate signaling or data information sent in the foregoing method embodiments, for example, generate transmission control information sent in steps S401, S601, S901, and S1201, may be further configured to determine transmission directions of a first link and at least one second link, for example, may perform steps S902 and S1201, and may be further configured to control, based on the transmission control information, the transceiver module 1520 to complete transmission of a first data packet on the first link, for example, may perform step S402.

The transceiver module 1520 is configured to support the first AP in communicating with a second AP, a station, and another node. It may be understood that the transceiver module may include a receiving module and a sending module. The sending module may be configured to perform steps S401, S601. S604, S901, and S1201 in the foregoing method embodiments, or configured to perform steps S903.1, S904.2, S905.1. S906.1, S1203.1, S1203.3, and S1204.2. The receiving module may be configured to perform step S603 in the foregoing method embodiments, or configured to perform steps S903.2, S904.3, S905.2. S906.2, 1203.2, and S1204.3.

It should be understood that the apparatus 1500 according to this embodiment of this application may correspond to the first access point in the methods of the foregoing embodiments, and the foregoing and other management operations and/or functions of the modules in the apparatus 1500 are intended to implement corresponding steps in the foregoing methods. For brevity, details are not described herein again.

Alternatively, the apparatus 1500 may be configured as a universal processing system, which, for example, is generally referred to as a chip. The processing module 1510 may include one or more processors that provide a processing function. The transceiver module 1520, for example, may be an input/output interface, a pin, or a circuit. The input/output interface may be configured to be responsible for information exchange between the chip system and the outside. For example, the input/output interface may output the transmission control information generated by the first AP to another module outside the chip for processing. The processing module may execute a computer-executable instruction stored in the storage module, to implement the functions of the first access point in the foregoing method embodiments. In an example, the storage module 1530 optionally included in the apparatus 1500 may be a storage unit in the chip, such as a register or a cache. Alternatively, the storage module 1530 may be a storage unit located outside the chip, such as a read-only memory (ROM), another type of static storage device that can store static information and an instruction, or a random-access memory (RAM).

Figure 16:
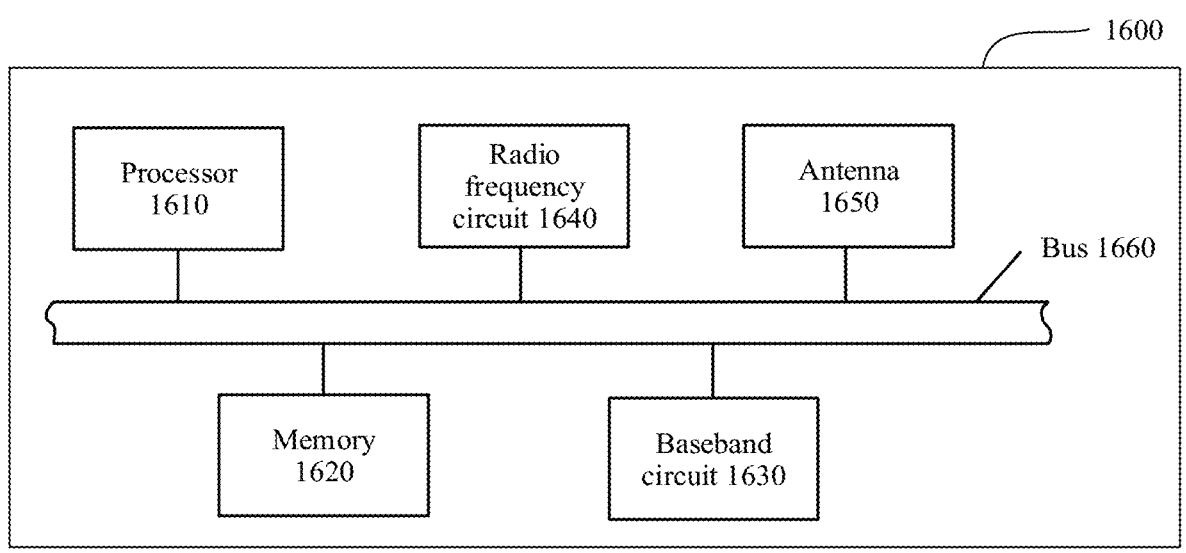
FIG. 16 is a schematic block diagram of another apparatus on a first access point side.

In another example, FIG. 16 is a schematic block diagram of another communications apparatus 1600 on a first access point side according to an embodiment of this application. The apparatus 1600 in this embodiment of this application may be the first access point in the foregoing method embodiments, and the apparatus 1600 may be configured to perform some or all functions of the first access point in the foregoing method embodiments. The apparatus 1600 may include a processor 1610, a baseband circuit 1630, a radio frequency circuit 1640, and an antenna 1650. Optionally, the apparatus 1600 may further include a memory 1620. Components of the apparatus 1600 are coupled together using a bus 1660. In addition to a data bus, the bus system 1660 includes a power bus, a control bus, and a status signal bus. However, for clear description, various types of buses in the figure are marked as the bus system 1660.

The processor 1610 may be configured to control the first access point, and is configured to perform processing performed by the first access point in the foregoing embodiments. The processor 1610 may perform a processing process related to the first access point in the foregoing method embodiments and/or another process used for the technology described in this application. Further, the processor 1610 may run an operating system, is responsible for managing the bus, and may execute a program or an instruction stored in the memory.

The baseband circuit 1630, the radio frequency circuit 1640, and the antenna 1650 may be configured to support information receiving and sending between the first access point and the second access point or the station in the foregoing embodiments, to support wireless communication between the first access point and another node. For example, the transmission control information sent by the first access point may be processed by the processor 1610, processed by the baseband circuit 1630 through baseband processing such as protocol-based encapsulation and encoding, processed by the radio frequency circuit 1640 through radio frequency processing such as analog conversion, filtering, amplification, and up-conversion, and sent to the second AP through the antenna 1650. It may be understood that the baseband circuit 1630, the radio frequency circuit 1640, and the antenna 1650 may be further configured to support the first access point in communicating with another network entity.

The memory 1620 may be configured to store program code and data of the first access point, and the memory 1620 may be the storage module 1530 in FIG. 15, for example configured to support the first access point in communicating with a network element on a core network side. In FIG. 16, the memory 1620 is shown as separated from the processor 1610. However, it is readily figured out by a person skilled in the art that the memory 1620 or any portion thereof may be located outside the apparatus 1600. For example, the memory 1620 may include a transmission cable and/or a computer product separated from a wireless node. These media may be accessed by the processor 1610 using the bus interface 1660. Alternatively, the memory 1620 or any portion thereof may be integrated into the processor 1610, for example, may be a cache and/or a general purpose register.

In an example, the transceiver module 1520 in FIG. 15 may include the baseband circuit 1630, the radio frequency circuit 1640, and the antenna 1650. The processing module 1510 may be the processor 1610. In another example, the transceiver module 1520 in FIG. 15 may include only the antenna in FIG. 16. The processing module 1510 may include not only the processor 1610, but also the radio frequency circuit 1640 and the baseband circuit 1630. In still another example, the processing module 1510 in FIG. 15 may include the processor 1610 and the baseband circuit 1630. The transceiver module 1520 may include the radio frequency circuit 1640 and the antenna 1650.

It may be understood that FIG. 16 merely shows a simplified design of the first access point. In actual application, for example, the first access point may include any quantity of transmitters, receivers, processors, memories, and the like, and all first access points that can implement the present disclosure fall within the protection scope of the present disclosure.

Figure 17:
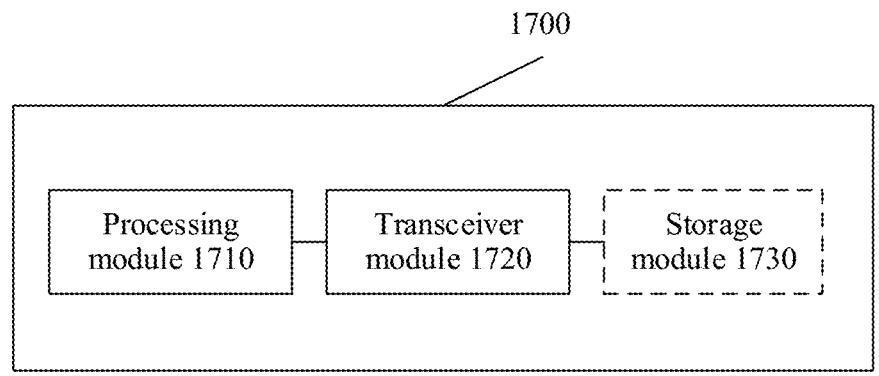
FIG. 17 is a schematic block diagram of an apparatus on a first access point side.

FIG. 17 is a schematic block diagram of an apparatus 1700 on a second access point side according to an embodiment of this application. In an embodiment, the apparatus 1700 shown in FIG. 17 may correspond to the apparatus on the second access point side in the foregoing method embodiments, and may have any function of the second access point in the methods. Optionally, the apparatus 1700 in this embodiment of this application may be the second access point, or may be a chip in the second access point. The apparatus 1700 may include a processing module 1710 and a transceiver module 1720. Optionally, the apparatus 1700 may further include a storage module 1730.

For example, the processing module 1710 may be configured to control the transceiver module 1720 to complete transmission of a second data packet on a second link, for example, perform step S403 in the foregoing method embodiments, may be configured to determine transmission directions of a first link and the second link based on transmission link control information, for example configured to perform steps S702, S1102, and S1302, or may be configured to select a transmission direction based on a service requirement of the apparatus, for example configured to perform steps S704.1. S904.1, and S1104.1.

The transceiver module 1720 is configured to support the second AP in communicating with a first AP, a station, and another node. It may be understood that the transceiver module may include a receiving module and a sending module. The receiving module may be configured to receive signaling information or signaling information. For example, the receiving module may be configured to perform steps S701. S1101, and S1301 in the foregoing method embodiments, or configured to perform steps S703.3, S704.3, S704.7. S706.2. S1103.2, S1104.3, S1204.3, S1303.3, and S1304.2. The sending module may be configured to perform steps S704.4, S704.6, S706.1. S706.3, S1103.1, S1103.3. S1303.2, and S1304.3 in the foregoing method embodiments.

It should be understood that the apparatus 1700 according to this embodiment of this application may correspond to the second access point in the methods of the foregoing embodiments, and the foregoing and other management operations and/or functions of the modules in the apparatus 1700 are intended to implement corresponding steps in the foregoing methods. For brevity, details are not described herein again.

Alternatively, the apparatus 1700 may be configured as a universal processing system, which, for example, is generally referred to as a chip. The processing module 1710 may include one or more processors that provide a processing function. The transceiver module 1720, for example, may be an input/output interface, a pin, or a circuit. The input/output interface may be configured to be responsible for information exchange between the chip system and the outside. For example, the input/output interface may input, to the processing module 1710 for processing, the transmission control information input by another module outside the chip. The processing module may execute a computer-executable instruction stored in the storage module, to implement the functions of the second access point in the foregoing method embodiments. In an example, the storage module 1730 optionally included in the apparatus 1700 may be a storage unit in the chip, such as a register or a cache. Alternatively, the storage module 1730 may be a storage unit located outside the chip, such as a ROM, another type of static storage device that can store static information and an instruction, or a RAM.

Figure 18:
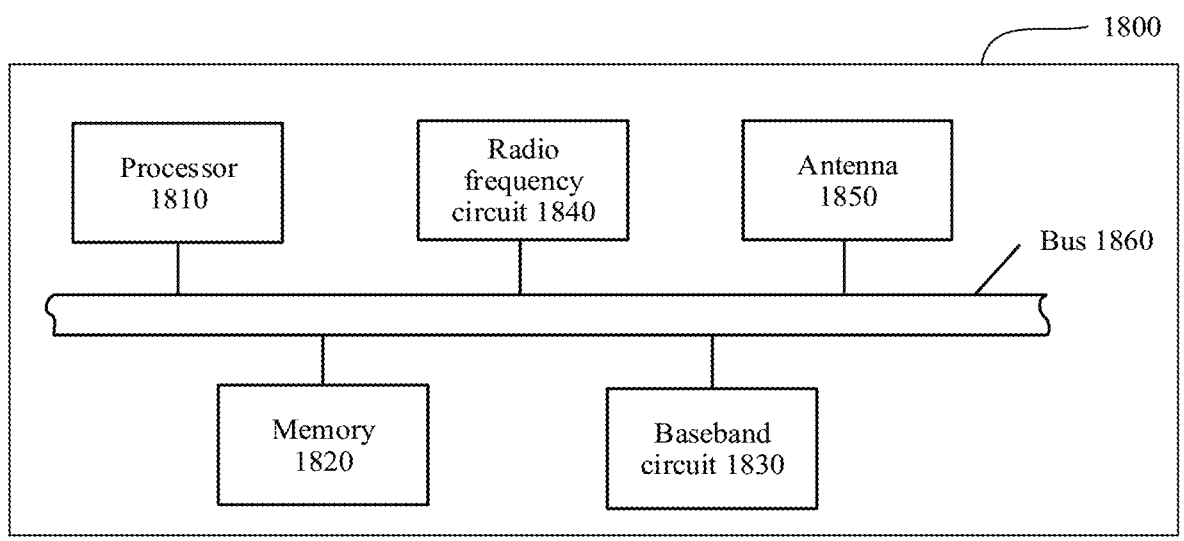
FIG. 18 is a schematic block diagram of another apparatus on a first access point side.

In another example, FIG. 18 is a schematic block diagram of another communications apparatus 1800 on a second access point side according to an embodiment of this application. The apparatus 1800 in this embodiment of this application may be the second access point in the foregoing method embodiments, and the apparatus 1800 may be configured to perform some or all functions of the second access point in the foregoing method embodiments. The apparatus 1800 may include a processor 1810, a baseband circuit 1830, a radio frequency circuit 1840, and an antenna 1850. Optionally, the apparatus 1800 may further include a memory 1820. Components of the apparatus 1800 are coupled together using a bus 1860. In addition to a data bus, the bus system 1860 includes a power bus, a control bus, and a status signal bus. However, for clear description, various types of buses in the figure are marked as the bus system 1860.

The processor 1810 may be configured to control the second access point, and is configured to perform processing performed by the second access point in the foregoing embodiments. The processor 1810 may perform a processing process related to the second access point in the foregoing method embodiments and/or another process used for the technology described in this application. Further, the processor 1810 may run an operating system, is responsible for managing the bus, and may execute a program or an instruction stored in the memory.

The baseband circuit 1830, the radio frequency circuit 1840, and the antenna 1850 may be configured to support information receiving and sending between the second access point and the first access point or the station in the foregoing embodiments, to support wireless communication between the second access point and another node. In an example, the transmission control information sent by the first access point is received through the antenna 1850. Then, the transmission control information is processed by the radio frequency circuit 1840 through processing such as filtering, amplification, down-conversion, and digitization, processed by the baseband circuit 1830 through baseband processing such as decoding and protocol-based data decapsulation, and then processed by the processor 1810 to recover service data and signaling information that are sent by the station.

The memory 1820 may be configured to store program code and data of the second access point, and the memory 1820 may be the storage module 1730 in FIG. 17. In FIG. 18, the memory 1820 is shown as separated from the processor 1810. However, it is readily figured out by a person skilled in the art that the memory 1820 or any portion thereof may be located outside the apparatus 1800. For example, the memory 1820 may include a transmission cable and/or a computer product separated from a wireless node. These media may be accessed by the processor 1810 using the bus interface 1860. Alternatively, the memory 1820 or any portion thereof may be integrated into the processor 1810, for example, may be a cache and/or a general purpose register.

In an example, the transceiver module 1720 in FIG. 17 may include the baseband circuit 1830, the radio frequency circuit 1840, and the antenna 1850. The processing module 1710 may be the processor 1810. In another example, the transceiver module 1720 in FIG. 17 may include only the antenna 1850 in FIG. 18. The processing module 1710 may include not only the processor 1810, but also the radio frequency circuit 1840 and the baseband circuit 1830. In still another example, the processing module 1710 in FIG. 17 may include the processor 1810 and the baseband circuit 1830. The transceiver module 1720 may include the radio frequency circuit 1840 and the antenna 1850.

It may be understood that FIG. 18 merely shows a simplified design of the second access point. In actual application, for example, the second access point may include any quantity of transmitters, receivers, processors, memories, and the like, and all second access points that can implement the present disclosure fall within the protection scope of the present disclosure.

An embodiment of this application further provides a computer storage medium. The computer-readable storage medium stores an instruction, and the instruction may be executed by one or more processors on a processing circuit. When the instruction is run on a computer, the computer is enabled to perform the methods in the foregoing aspects.

An embodiment of this application further provides a chip system. The chip system includes a processor configured to support a distributed unit, a centralized unit, a first access point, and a second access point to implement a function in the foregoing embodiments, for example, generate or process data and/or information in the foregoing methods.

In a possible design, the chip system may further include a memory. The memory is configured to store program instructions and data that are necessary for the distributed unit, the centralized unit, the first access point, and the second access point. The chip system may include a chip, or may include a chip and another discrete component.

An embodiment of this application further provides a processor configured to be coupled to a memory. The processor is configured to perform the method and the function of the first AP in any one of the foregoing embodiments.

An embodiment of this application further provides a processor configured to be coupled to a memory. The processor is configured to perform the method and the function of the second AP in any one of the foregoing embodiments.

An embodiment of this application further provides a computer program product including an instruction. When the computer program product runs on a computer, the computer is enabled to perform the method and the function of the first AP in any one of the foregoing embodiments.

An embodiment of this application further provides a computer program product including an instruction. When the computer program product runs on a computer, the computer is enabled to perform the method and the function of the second AP in any one of the foregoing embodiments.

An embodiment of this application further provides a wireless communications system. The system includes the first access point and the at least one second access point in the foregoing embodiments.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. A method implemented by a first access point (AP), wherein the method comprises:
    sending transmission control information comprising an identifier of a second AP, a first end time identifier indicating an end time of a first data packet on a first link, and link transmission direction information by coordinating, in advance by the first AP, a spatial reuse transmission direction of a second link, wherein the second link is concurrent with the first link, wherein the identifier of the second AP indicates whether the second AP can participate in spatial reuse transmission to randomly select a service transmission direction based on a service requirement, wherein the link transmission direction information indicates uplink or downlink transmission directions of the first link and the second link to the second AP to complete first transmission of a second data packet on the second link based on the link transmission direction information, wherein the first link is located between the first AP and a first station (STA) associated with the first AP, wherein the second link is located between the second AP and a second STA or is located between two third STAs, and wherein the second STA and the two third STAs are associated with the second AP; and
    completing second transmission of the first data packet on the first link based on the link transmission direction information.

2. The method of claim 1, wherein a first time range occupied by the first data packet on the first link is the same as a second time range occupied by the second data packet on the second link.

3. The method of claim 1, wherein the uplink or downlink transmission directions comprise:
    both the first link and the second link are uplinks;
    both the first link and the second link are downlinks;
    the first link is an uplink and the second link is a downlink;
    the first link is the downlink and the second link is the uplink;
    the first link is the uplink and the second link is either the uplink or the downlink;
    the first link is the downlink and the second link is either the uplink or the downlink;
    the first link is the uplink and the second link is a device-to-device (D2D) link; or
    the first link is the downlink and the second link is a D2D link.

4. The method of claim 3, further comprising determining, based on energy detection, whether the second AP sends a second trigger frame when the link transmission direction information indicates that the first link is the downlink and the second link is either the uplink or the downlink, wherein when the first AP detects that the second AP sends the second trigger frame, completing the second transmission of the first data packet on the first link comprises:
    receiving the second trigger frame from the second AP at a first time point; and
    sending the first data packet to the first STA after a first time interval from the first time point, and
    wherein when the first AP does not detect that the second AP sends the second trigger frame, completing the second transmission of the first data packet on the first link comprises:
    sending a radio frame carrying the transmission control information at a second time point; and
    sending the first data packet to the first STA after a second time interval from the second time point.

5. The method of claim 1, wherein the identifier of the second AP comprises a medium access control (MAC) address of the second AP.

6. A method implemented by a second access point (AP), wherein the method comprises:
    receiving, from a first AP, transmission control information comprising an identifier of the second AP, a first end time identifier indicating an end time of a first data packet on a first link, and link transmission direction information indicating uplink or downlink transmission directions of the first link and a second link to the second AP, wherein the identifier of the second AP indicates whether the second AP can participate in spatial reuse transmission to randomly select a service transmission direction based on a service requirement, wherein the second link is concurrent with the first link, wherein a spatial reuse transmission direction of the second link is coordinated in advance by the first AP, wherein the first link is located between the first AP and a first station (STA) associated with the first AP, wherein the second link is located between the second AP and a second STA or is located between two third STAs, and wherein the second STA and the two third STAs are associated with the second AP; and
    completing first transmission of a second data packet on the second link based on the link transmission direction information.

7. The method of claim 6, wherein a first time range occupied by the first data packet on the first link is the same as a second time range occupied by the second data packet on the second link.

8. The method of claim 6, wherein the uplink or downlink transmission directions comprise:
- both the first link and the second link are uplinks;
- both the first link and the second link are downlinks;
- the first link is an uplink and the second link is a downlink;
- the first link is the downlink and the second link is the uplink;
- the first link is the uplink and the second link is either the uplink or the downlink;
- the first link is the downlink and the second link is either the uplink or the downlink;
- the first link is the uplink and the second link is a device-to-device (D2D) link; or
- the first link is the downlink and the second link is a D2D link.

9. The method of claim 8, further comprising determining, based on a service requirement, that the second link is either the uplink or the downlink when the link transmission direction information indicates that the first link is the downlink and the second link is either the uplink or the downlink, wherein when the second AP determines that the second link is the uplink, completing the first transmission of the second data packet on the second link comprises:
- receiving the transmission control information at a first time point; and
- sending a second trigger frame to the second STA after a first time interval from the first time point, wherein the second trigger frame triggers the second STA to send the second data packet to the second AP, and
- wherein when the second AP determines that the second link is the downlink, completing the first transmission of the second data packet on the second link comprises:
  - receiving a radio frame carrying the transmission control information at a second time point; and
  - sending the second data packet to the second STA after a second time interval from the second time point.

10. The method of claim 6, wherein the identifier of the second AP comprises a medium access control (MAC) address of the second AP.

11. An apparatus on a first access point (AP), the apparatus comprising:
- a transceiver configured to send transmission control information comprising an identifier of a second AP, a first end time identifier indicating an end time of a first data packet on a first link, and link transmission direction information indicating uplink or downlink transmission directions of the first link and a second link to the second AP to complete first transmission of a second data packet on the second link based on the link transmission direction information, wherein the identifier of the second AP indicates whether the second AP can participate in spatial reuse transmission to randomly select a service transmission direction based on a service requirement, wherein a spatial reuse transmission direction of the second link is coordinated in advance by the first AP, wherein the second link that is concurrent with the first link, wherein the first link is located between the first AP and a first station (STA) associated with the first AP, wherein the second link is located between the second AP and a second STA or is located between two third STAs, and wherein the second STA and the two third STAs are associated with the second AP; and
- a processor coupled to the transceiver and configured to control, based on the link transmission direction information, the transceiver to complete second transmission of the first data packet on the first link.

12. The apparatus of claim 11, wherein a first time range occupied by the first data packet on the first link is the same as a second time range occupied by the second data packet on the second link.

13. The apparatus of claim 11, wherein the uplink or downlink transmission directions comprise:
- both the first link and the second link are uplinks;
- both the first link and the second link are downlinks;
- the first link is an uplink and the second link is a downlink;
- the first link is the downlink and the second link is the uplink;
- the first link is the uplink and the second link is the uplink or the a downlink;
- the first link is the downlink and the second link is the uplink or a downlink;
- the first link is the uplink and the second link is a device-to-device (D2D) link; or
- the first link is the downlink and the second link is a D2D link.

14. The apparatus of claim 13, wherein the processor is further configured to determine, based on energy detection, whether the second AP sends a second trigger frame when the link transmission direction information indicates that the first link is the downlink and the second link is either the uplink or the downlink, and wherein the transceiver is further configured to:
- when the processor determines that the second AP sends the second trigger frame:
  - receive the second trigger frame from the second AP at a first time point; and
  - send the first data packet to the first STA after a first time interval from the first time point; and
- when the processor determines that the second AP does not send the second trigger frame:
  - send a radio frame carrying the transmission control information at a second time point; and
  - send the first data packet to the first STA after a second time interval from the second time point.

15. The apparatus of claim 11, wherein the identifier of the second AP comprises a medium access control (MAC) address of the second AP.

16. An apparatus on a second access point (AP), the apparatus comprising:
- a transceiver configured to receive transmission control information from a first AP, wherein the transmission control information comprises an identifier of a second AP, a first end time identifier indicating an end time of a first data packet on a first link, and uplink or downlink link transmission direction information indicating transmission directions of the first link and a second link to the second AP, wherein the identifier of the second AP indicates whether the second AP can participate in spatial reuse transmission to randomly select a service transmission direction based on a service requirement, wherein a spatial reuse transmission direction of the second link is coordinated in advance by the first AP, wherein the second link that is concurrent with the first link, wherein the first link is located between the first AP and a first station (STA) associated with the first AP, wherein the second link is located between the second AP and a second STA or is located between two third STAs, and wherein the second STA and the two third STAs are associated with the second AP; and a processor coupled to the transceiver and configured to control, based on the link transmission direction information, the transceiver to complete first transmission of a second data packet on the second link.

17. The apparatus of claim 16, wherein a first time range occupied by the first data packet on the first link is the same as a second time range occupied by the second data packet on the second link.

18. The apparatus of claim 16, wherein the uplink or downlink transmission directions comprise:
   both the first link and the second link are uplinks;
   both the first link and the second link are downlinks;
   the first link is an uplink and the second link is a downlink;
   the first link is the downlink and the second link is the uplink;
   the first link is the uplink and the second link is the uplink or the downlink;
   the first link is the downlink and the second link is the uplink or the a downlink;
   the first link is the uplink and the second link is a device-to-device (D2D) link; or
   the first link is the downlink and the second link is a D2D link.

19. The apparatus of claim 18, wherein the processor is further configured to determine, based on a service requirement, that the second link is either the uplink or the downlink when the link transmission direction information indicates that the first link is the downlink and the second link is either the uplink or the downlink, and wherein the transceiver is further configured to:
   when the processor determines that the second link is the uplink:
      receive the transmission control information at a first time point; and
      send a second trigger frame to the second STA after a first time interval from the first time point; and
   when the processor determines that the second link is the downlink:
      receive a radio frame carrying the transmission control information at a second time point; and
      send the second data packet to the second STA after a second time interval from the second time point.

20. The apparatus of claim 16, wherein the identifier of the second AP comprises a medium access control (MAC) address of the second AP.

* * * * *